(12) United States Patent
Imamura

(10) Patent No.: US 11,144,234 B2
(45) Date of Patent: Oct. 12, 2021

(54) APPARATUS, METHOD FOR STORAGE ACCESS MANAGEMENT, AND NON-TRANSITORY COMPUTER-READABLE STORAGE MEDIUM FOR STORING PROGRAM

(71) Applicant: FUJITSU LIMITED, Kawasaki (JP)

(72) Inventor: Satoshi Imamura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 49 days.

(21) Appl. No.: 16/361,286

(22) Filed: Mar. 22, 2019

(65) Prior Publication Data

US 2019/0369904 A1 Dec. 5, 2019

(30) Foreign Application Priority Data

May 30, 2018 (JP) .............................. JP2018-103193
Nov. 16, 2018 (JP) .............................. JP2018-215148

(51) Int. Cl.
*G06F 3/00* (2006.01)
*G06F 3/06* (2006.01)
*G06F 1/324* (2019.01)

(52) U.S. Cl.
CPC ............ *G06F 3/0653* (2013.01); *G06F 1/324* (2013.01); *G06F 3/061* (2013.01); *G06F 3/0688* (2013.01)

(58) Field of Classification Search
None
See application file for complete search history.

(56) References Cited

U.S. PATENT DOCUMENTS

| 2012/0239952 | A1 | 9/2012 | Nishiguchi et al. |
| 2015/0365309 | A1* | 12/2015 | Kaminski ........... H04L 43/0817 709/224 |
| 2019/0332384 | A1* | 10/2019 | Calhoun ............. G06F 12/1425 |

FOREIGN PATENT DOCUMENTS

| JP | 63-278166 | 11/1988 |
| JP | 8-77691 | 3/1996 |
| JP | 2006-48731 | 2/2006 |
| JP | 2006-72454 | 3/2006 |
| JP | 2012-194911 | 10/2012 |

* cited by examiner

*Primary Examiner* — Midys Rojas
(74) *Attorney, Agent, or Firm* — Fujitsu Patent Center

(57) ABSTRACT

An apparatus includes: a memory; and a processor coupled to the memory, the processor being configured to execute an access processing that includes making access to a storage, execute a monitoring processing that includes monitoring a state of usage of the storage in given timing, and execute a control processing that includes changing an operating frequency of the processor performing the access processing according to a monitoring result of the monitoring processing.

20 Claims, 19 Drawing Sheets

FIG. 4
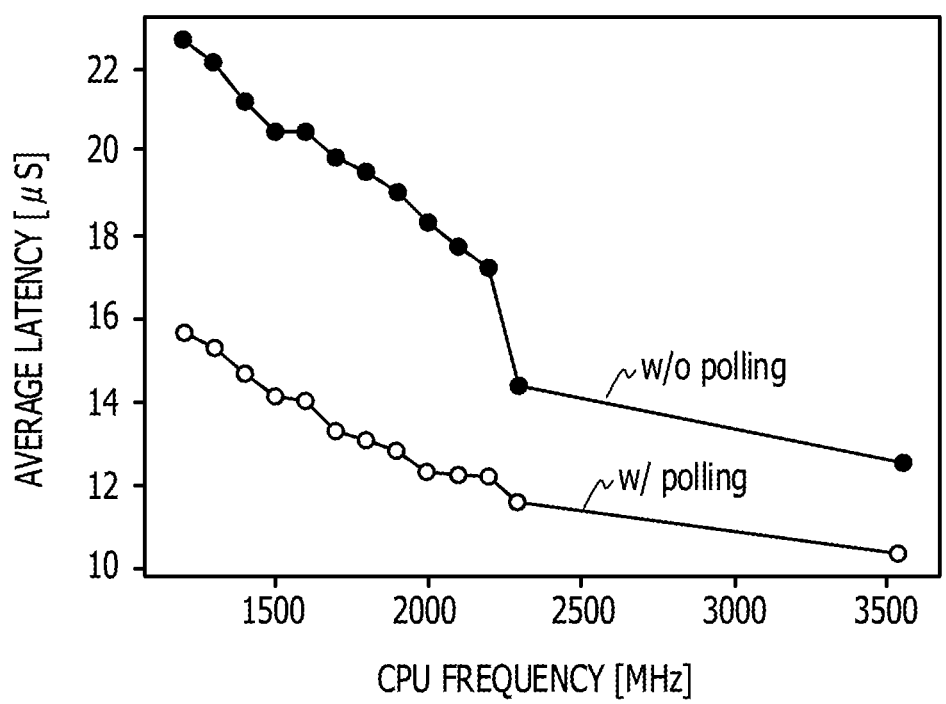
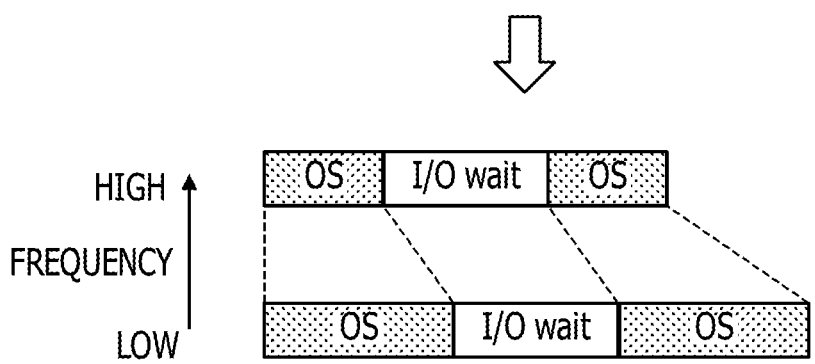

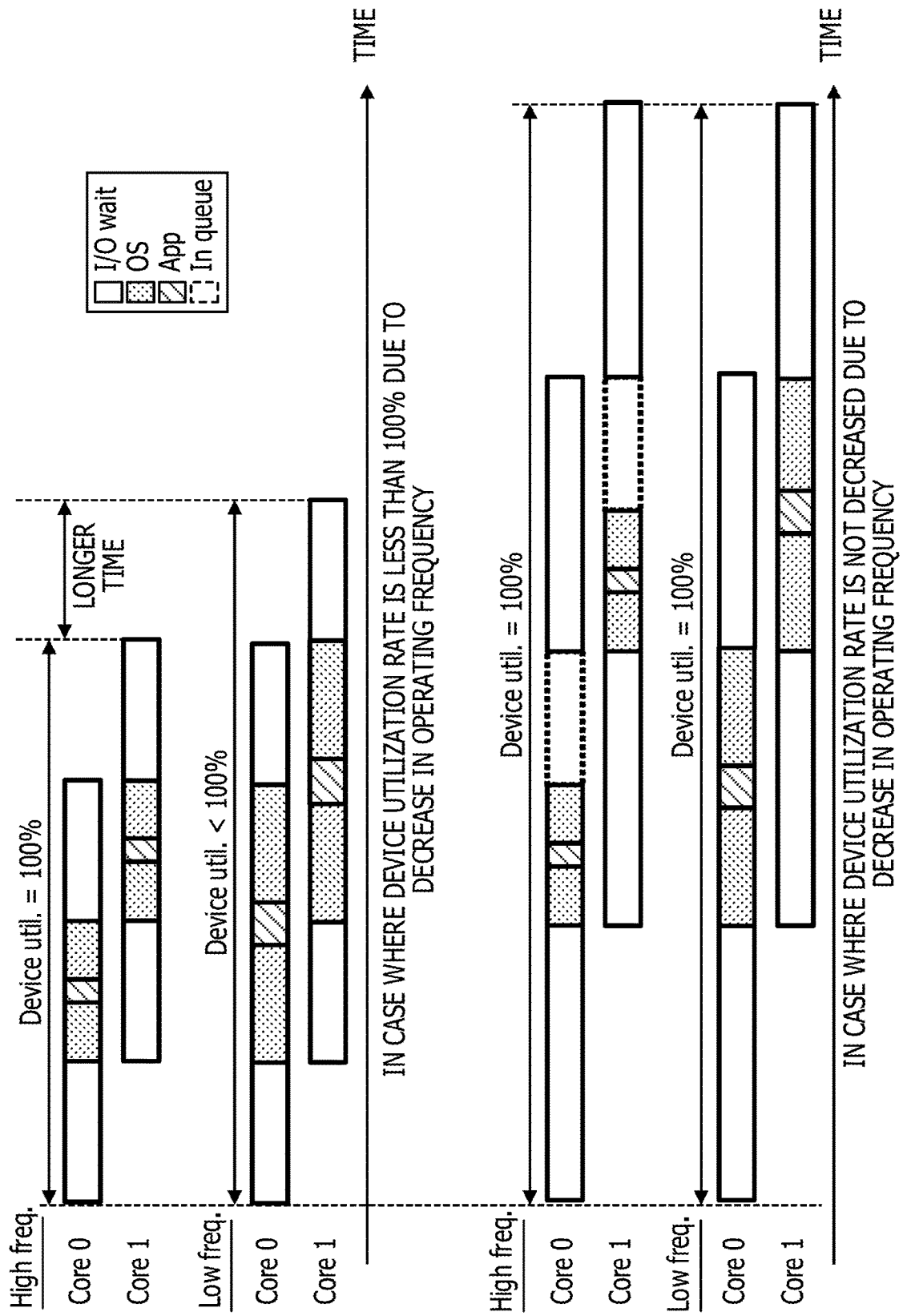

APPARATUS, METHOD FOR STORAGE ACCESS MANAGEMENT, AND NON-TRANSITORY COMPUTER-READABLE STORAGE MEDIUM FOR STORING PROGRAM

CROSS-REFERENCE TO RELATED APPLICATION

This application is based upon and claims the benefit of priority of the prior Japanese Patent Application Nos. 2018-215148, filed on Nov. 16, 2018, and 2018-103193, filed on May 30, 2018, the entire contents of which are incorporated herein by reference.

FIELD

The embodiments discussed herein are related to an apparatus, a method for storage access management, and a non-transitory computer-readable storage medium for storing a program.

BACKGROUND

In an information processing device, a computer system such as a server or the like, input/output (I/O) access is made from a processor such as a central processing unit (CPU) or the like to a storage, a storage device such as a solid state drive (SSD) or the like.

Cited as the SSD is, for example, an SSD employing a NAND-type flash memory (which SSD will hereinafter be described as a "NAND flash SSD"). Cited as the NAND flash SSD are, for example, an NVMe SSD (which may hereinafter be described also as an "NVMe NAND SSD"), a SATA SSD, or the like.

The NVMe SSD is an SSD supporting (complying with) non-volatile memory express (NVMe) using a peripheral component interconnect express (PCIe) interface (IF). The SATA SSD is an SSD supporting (complying with) an IF of serial attached small computer system interface (SCSI) (SATA) or the like.

In access from a processor to a storage, access processing occurs, the access processing including software processing that the processor performs by software and device processing performed by the storage (device). Incidentally, the software processing includes OS processing that the processor performs by an operating system (OS).

Examples of the related art include Japanese Laid-open Patent Publication No. 2006-48731, Japanese Laid-open Patent Publication No. 8-77691, Japanese Laid-open Patent Publication No. 2006-72454, Japanese Laid-open Patent Publication No. 63-278166, and Japanese Laid-open Patent Publication No. 2012-194911.

SUMMARY

According to an aspect of the embodiment, an apparatus includes: a memory; and a processor coupled to the memory, the processor being configured to execute an access processing that includes making access to a storage, execute a monitoring processing that includes monitoring a state of usage of the storage in given timing, and execute a control processing that includes changing an operating frequency of the processor performing the access processing according to a monitoring result of the monitoring processing.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram illustrating an example of changes in latency of access to a low-latency SSD due to decreases in operating frequency of a CPU;

FIG. 12 is a diagram illustrating an example of relation between operating frequency and a device utilization rate;

DESCRIPTION OF EMBODIMENTS

Figure 1:
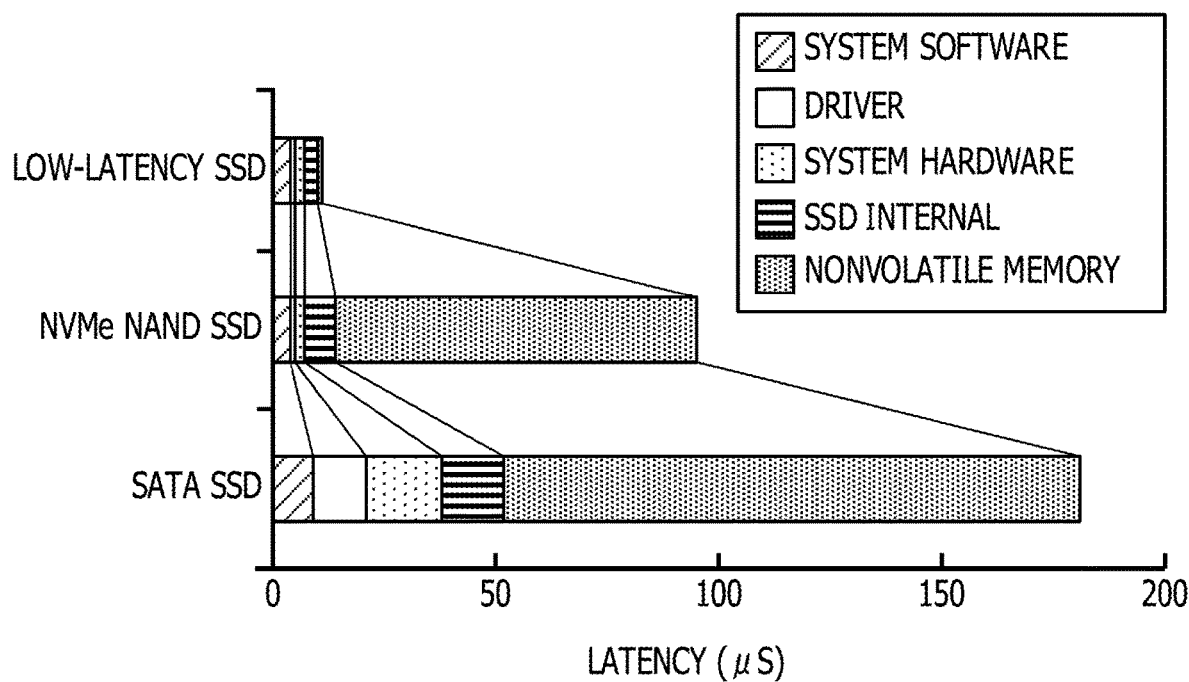
FIG. 1 is a diagram illustrating an example of a breakdown of processing times in processing of access to SSDs.

As described above, the processing of access to the storage includes software processing by the CPU and device processing by the storage. When the device processing is increased in speed (processing time is shortened) with an improvement in storage access performance, an overhead of the software processing as compared with the access performance may be noticeable.

In recent years, a low-latency SSD adopting a next-generation memory technology has made an appearance. Known as such a low-latency SSD is, for example, an Intel Optane SSD (registered trademark) adopting a 3D XPoint (registered trademark) technology.

The low-latency SSD has a low access latency, for example, a small processing time (delay time) or response time of the device processing, for example, a latency of approximately 1 to 20 μs, or a latency of 10 μs or less as an example. The low-latency SSD thus has a latency that is approximately 1/10 that of a NAND flash SSD.

Therefore, in an information processing device including a low-latency SSD that has good device performance and a high device processing speed, there is a possibility that an overhead of access performance by the software processing becomes more noticeable.

On the other hand, in order to increase the speed of the software processing (shorten the processing time), the processing performance of the CPU may be improved by increasing the operating frequency (clock) of the CPU, for example. However, increasing the operating frequency of the CPU causes an increase in power consumption of the CPU.

In one aspect, it is an object of the present technology to achieve both an improvement in storage access performance in an information processing device and a reduction in power consumption of a processor in access to a storage.

An embodiment of the present technology will hereinafter be described with reference to the drawings. However, the embodiment to be described in the following is illustrative only, and is not intended to exclude application of various modifications and technologies not explicitly illustrated in the following. For example, the present embodiment may be modified and carried out in various manners without departing from the spirit of the present technology. Incidentally, parts identified by the same reference numerals in the drawings to be used in the following description represent identical or similar parts unless otherwise specified.

1 First Embodiment

[1-1] Low-Latency SSD

Description will first be made of a low-latency SSD. FIG. 1 is a diagram illustrating an example of a breakdown of processing times in processing of access to SSDs. In FIG. 1, an axis of abscissas indicates latency (μs) of the access processing.

As illustrated in FIG. 1, attention will be directed to a breakdown of access processing times of a SATA SSD and an NVMe SSD. With the SATA SSD, an OS processing time (software processing time) obtained by adding together "System Software" and "Driver" is approximately 1/7 of a device processing time on an SSD side, the device processing time being obtained by adding together "SSD Internal" and "Nonvolatile Memory." In addition, with the NVMe SSD, the OS processing time is approximately 1/18 of the device processing time.

Thus, with a NAND flash SSD, the OS processing time at a time of access to the SSD accounts for a small proportion of the entire access processing time, and for higher access speed, OS processing and I/O time are not regarded as important but consideration is often given to shortening the device processing time.

On the other hand, the low-latency SSD has an access processing time greatly shortened as compared with the NAND flash SSD, and has a latency that is approximately 1/15 that of the SATA SSD and approximately 1/9 that of the NVMe NAND SSD when determined from the entire processing time of access processing. For example, as illustrated in FIG. 1, the low-latency SSD shortens the processing time of "Nonvolatile Memory" in the device processing. Thus, the low-latency SSD is an SSD having a lower latency than the SATA SSD and the NVMe NAND SSD.

Therefore, with the low-latency SSD, the OS processing time becomes a processing time (consumed time) nearly equal to the device processing time, and thus an overhead of the OS processing becomes noticeable. For example, with the low-latency SSD, the OS processing that is not often regarded as important for the NAND flash SSD accounts for a larger proportion of the processing time of access processing (from approximately 1/15 to 1/7 to approximately half), and thus an effect of the OS processing on SSD access performance is increased.

Figure 2:
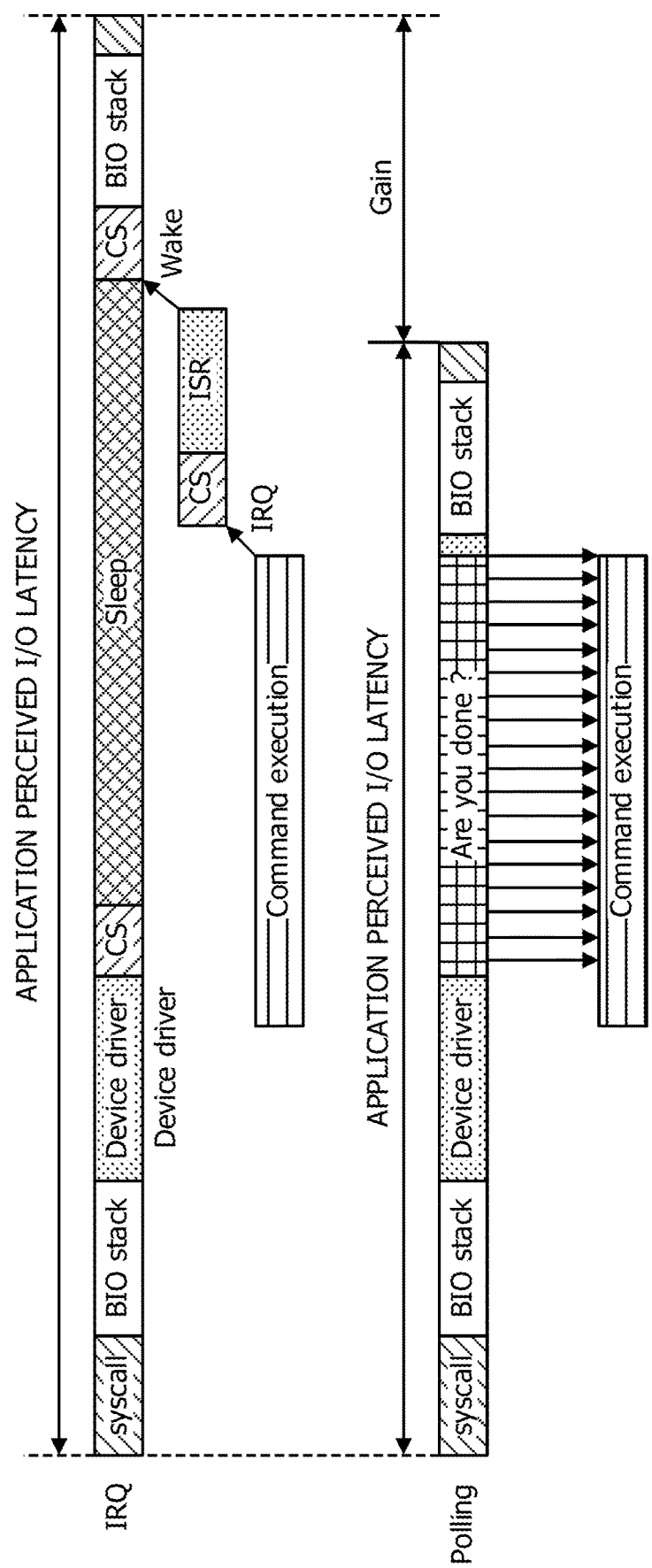
FIG. 2 is a diagram illustrating an example of processing of an OS by an interrupt request (IRQ) and polling.

Incidentally, polling implemented in an NVMe driver of Linux (registered trademark) is known as a method of reducing the overhead of the OS processing. FIG. 2 is a diagram illustrating a breakdown of OS processing times of an IRQ (Interrupt Request) and polling. In FIG. 2, an axis of abscissas indicates processing time. In FIG. 2, "syscall" (system call) denotes calling processing of a kernel from an OS, and "BIO stack" denotes software processing for handing over an I/O command to a driver. Incidentally, BIO is an abbreviation of Block 10.

In polling I/O, a CPU core that issues an I/O request to a device monitors completion of I/O access. In the example of FIG. 2, the CPU monitors, in a lower part of FIG. 2, completion of "Command execution" as I/O access to the device in a period of "Are you done?" as polling processing.

Therefore, the processing of "CS" and "ISR" may be excluded as compared with an interrupt I/O where the OS performs "Sleep" during an I/O wait, and is returned from sleep by an interrupt after I/O completion, as in an interrupt I/O illustrated in an upper part of FIG. 2.

Incidentally, context switch (CS) is a function for sharing the CPU between processes, and may include processing of storing and/or restoring the state of the CPU. Interrupt service routine (ISR) is a callback routine of the OS and a device driver started by the IRQ. ISR may be referred to as an interrupt handler.

According to the polling I/O, there is no period of "Sleep" in which a CPU utilization rate is low as illustrated in the upper part of FIG. 2, and therefore the monitoring increases the CPU utilization rate even during the I/O wait. However, the exclusion of the CS and ISR processing is expected to shorten the OS processing time by a "Gain" period illustrated in the lower part.

Here, as illustrated in an upper part of FIG. 3, a computer system assumes a case where a low-latency SSD is incorporated as a storage device, and a CPU executes an I/O-intensive application (that may hereinafter be described as an "I/O-intensive app").

The I/O-intensive app is an application that makes access of highly frequent I/O, for example, synchronous I/O, to an SSD, and is an application that itself has a short processing time but imposes a load on I/O processing in the OS and a device. Access performance resulting from the execution of the I/O-intensive app depends on the access latency and throughput of the SSD.

Figure 3:
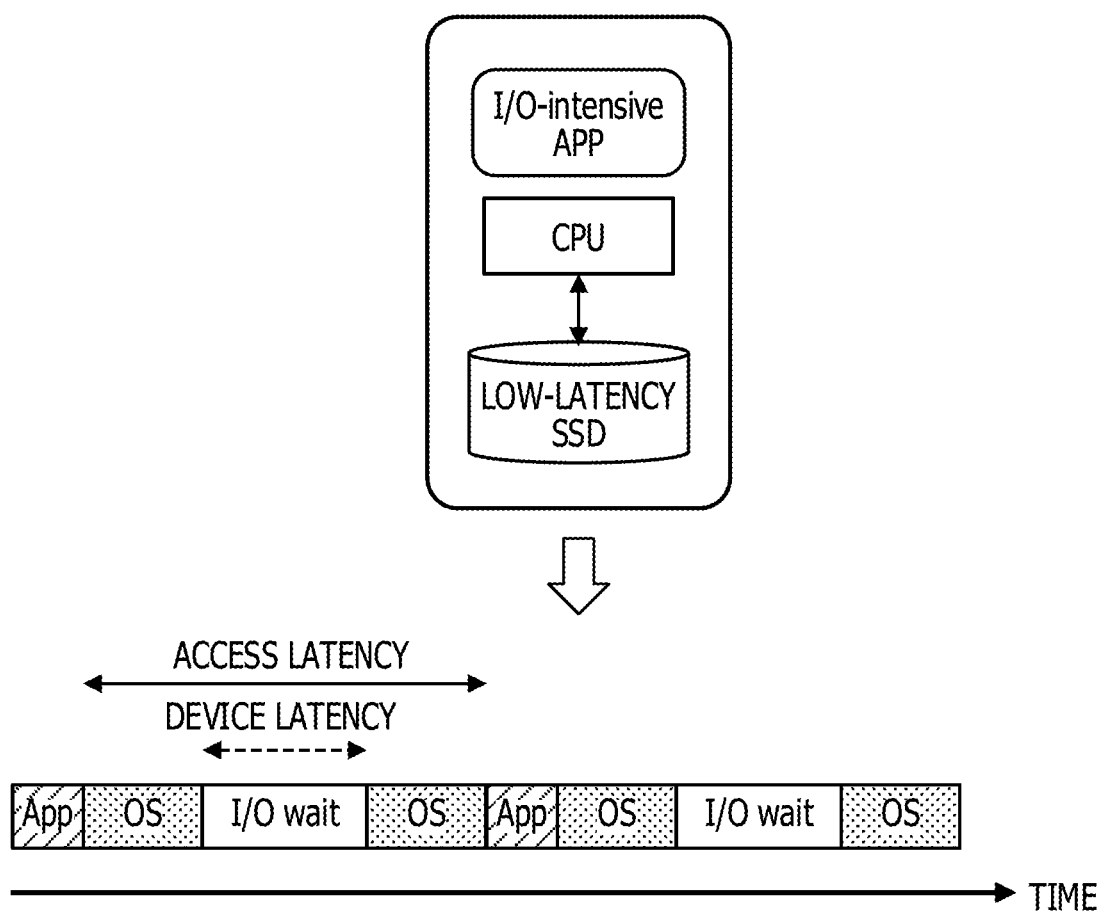
FIG. 3 is a diagram illustrating an example of processing of a CPU core at a time of execution of an I/O-intensive application.

The processing of a CPU core in the case where the I/O-intensive app is executed includes "App," "OS," and "I/O wait," as illustrated in a lower part of FIG. 3. "App" is the processing time of the I/O-intensive app. "OS" is the processing time of OS processing. "I/O wait" is an I/O access completion wait time, and corresponds to the processing time of device processing in the device (low-latency SSD). In the following, the period of "I/O wait" will be described as "device latency," and the period of "I/O wait" and the periods of "OS" executed before and after the period of "I/O wait" will be described as "access latency."

The computer system illustrated in FIG. 3 may control voltage supplied to the CPU and operating frequency by software.

There is a correlation as in the following between the operating frequency of the CPU and latency of access to the SSD. FIG. 4 is a diagram illustrating an example of changes in latency of access to a low-latency SSD due to decreases in operating frequency of a CPU.

Graphs illustrated in an upper part of FIG. 4 illustrate a relation between CPU frequency (MHz) (axis of abscissas) and average access latency (µs) (axis of ordinates). Incidentally, the graph of "w/o polling" represents a case where the IRQ illustrated in the upper part of FIG. 2 is executed in the OS processing, and the graph of "w/polling" illustrates a case where the polling I/O illustrated in the lower part of FIG. 2 is executed in the OS processing. In addition, a diagram illustrated in a lower part of FIG. 4 illustrates a breakdown of access latency in a case of a high operating frequency of the CPU and a breakdown of access latency in a case of a low operating frequency of the CPU.

As described above, the OS processing of processing of access to the SSD is performed by the CPU. In addition, the processing speed of the CPU depends on the operating frequency. Therefore, as illustrated in the upper part and the lower part of FIG. 4, the lower the CPU operating frequency, the longer the processing time of access processing, for example, the OS processing, and the greater an effect on the SSD access latency. Hence, in order to shorten the access latency, it is effective to set the operating frequency high.

For example, in Linux (registered trademark), the OS may control the operating frequency of the CPU by an intel_pstate driver. The intel_pstate driver allows usage of the following two kinds of policies.

"performance": sets the operating frequency at a maximum when a load is imposed on the CPU core.

"powersave": sets the operating frequency according to the utilization rate of the CPU core.

Figure 5A:
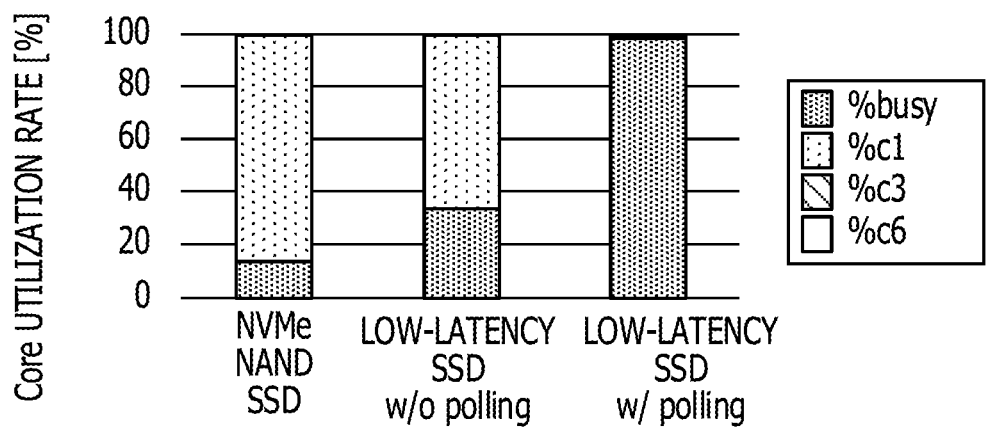
FIGS. 5A and 5B are diagrams illustrating an example of control of operating frequency at a time of access to an SSD.
Figure 5B:
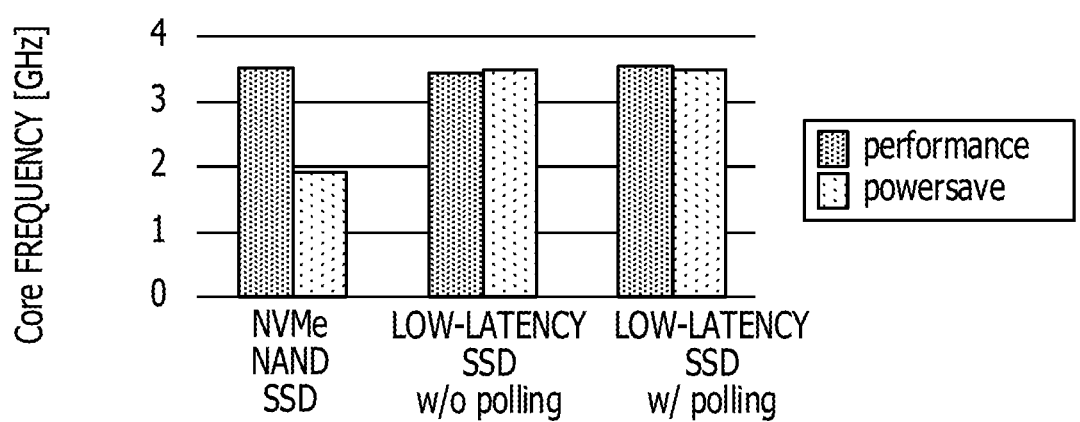

FIGS. 5A and 5B are diagrams illustrating an example of control of operating frequency at a time of access to an SSD. As illustrated in FIGS. 5A and 5B, a core utilization rate (%) (see FIG. 5A) and core frequency (GHz) (see FIG. 5B) are both increased in order of the NVMe NAND SSD, the low-latency SSD (without polling), and the low-latency SSD (with polling).

As illustrated in FIG. 5A, for example, the CPU utilization rate is close to 100% in the case of the low-latency SSD (with polling). In addition, as illustrated in FIG. 5B, in the low-latency SSD, irrespective of the presence or absence of polling, both policies of "performance" and "powersave" maximize the operating frequency, so that the access latency is minimized.

Incidentally, "% busy" illustrated in FIG. 5A denotes that the CPU core is in a busy state. In addition, "% c1," "% c3," and "% c6" denote that the CPU core is in a sleep state, and a large number following "% c" indicates deeper sleep (with lower power consumption).

Figure 6A:
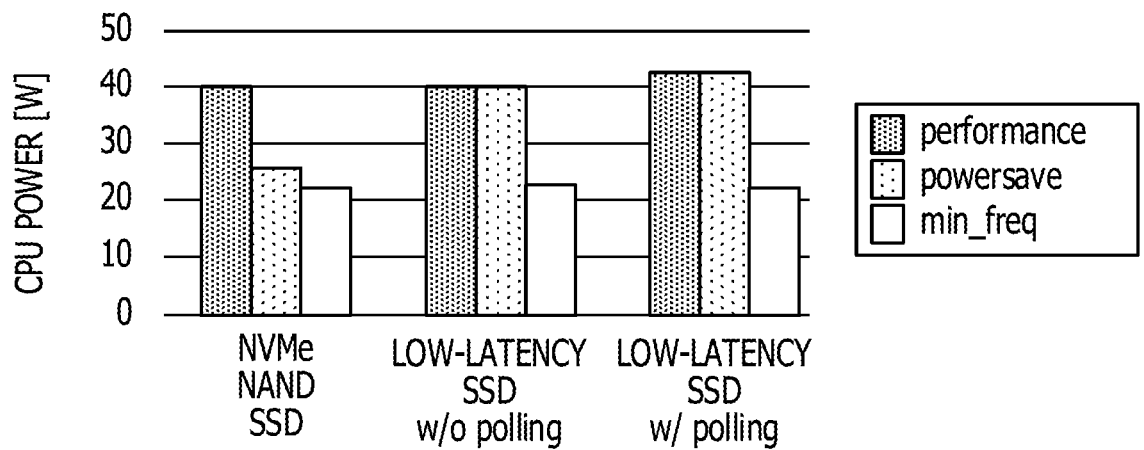
FIGS. 6A and 6B are diagrams illustrating an example of CPU power and latency at a time of SSD access.
Figure 6B:
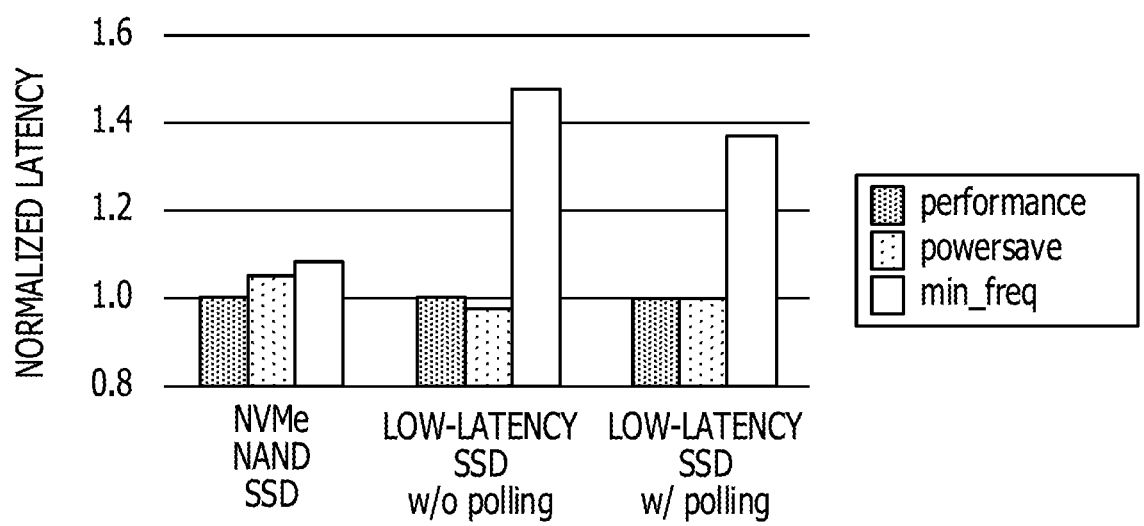

FIGS. 6A and 6B are diagrams illustrating an example of CPU power and latency at a time of SSD access. As illustrated in FIG. 6A, CPU power (power consumption) by operating policy is increased in order of "min_freq," which sets the operating frequency at a lowest level, the above-described "powersave," and the above-described "performance." In "performance," for example, the CPU core operates at a maximum frequency, and thus power consumption is maximized. In addition, CPU power is consumed also during an I/O wait.

As illustrated in FIG. 6B, latency by operating policy is increased (processing time is increased) in order of "performance," "powersave," and "min_freq." When the operating policy is thus changed, the operating frequency of the CPU core is decreased, so that CPU power may be reduced. However, this increases the OS processing time.

Figure 7:
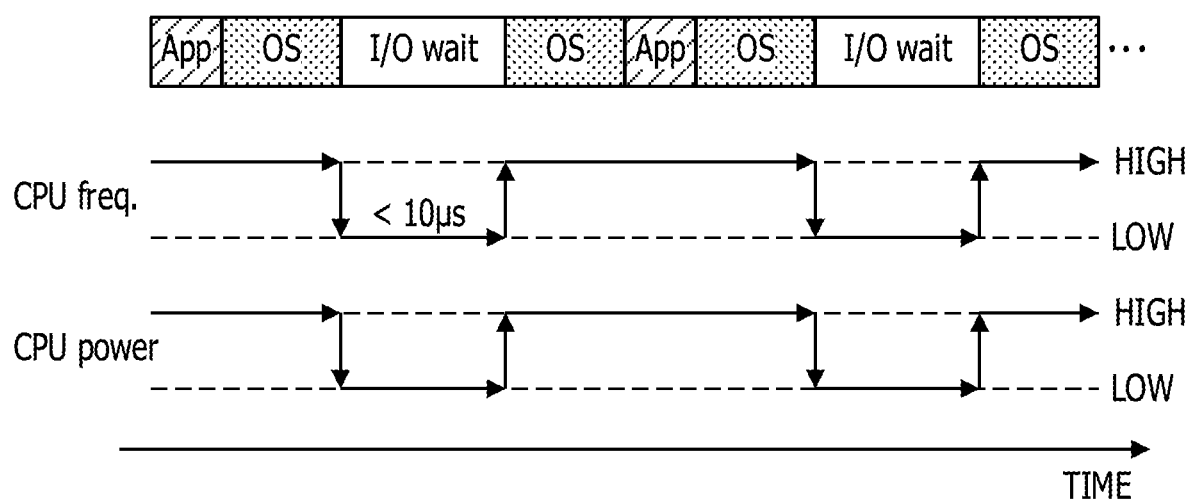
FIG. 7 is a diagram illustrating an example of an ideal CPU power reducing method.

Incidentally, cited as an ideal CPU power reducing method is a method of decreasing the operating frequency of the CPU core only during the period of an I/O wait (for example, during the device processing) in processing of access to the low-latency SSD, as illustrated in FIG. 7. According to this method, when the software processing including the OS processing is performed, the operating frequency of the CPU core may be maximized, so that the access latency may be minimized.

However, a time taken to change the operating frequency in an existing CPU is a few tens of µs. It is thus difficult to change the operating frequency only during the I/O wait (for example, less than 10 µs) for a storage having a short device processing time, such as the low-latency SSD or the like.

Accordingly, in a first embodiment, description will be made of a method of reducing power consumption of a CPU at a time of access to a low-latency SSD while suppressing a degradation in performance of an application executed by the CPU.

[1-2] Example of Configuration of First Embodiment

Description will next be made of an example of a configuration of a computer 1 according to the first embodiment.

[1-2-1] Example of Hardware Configuration

Figure 8:
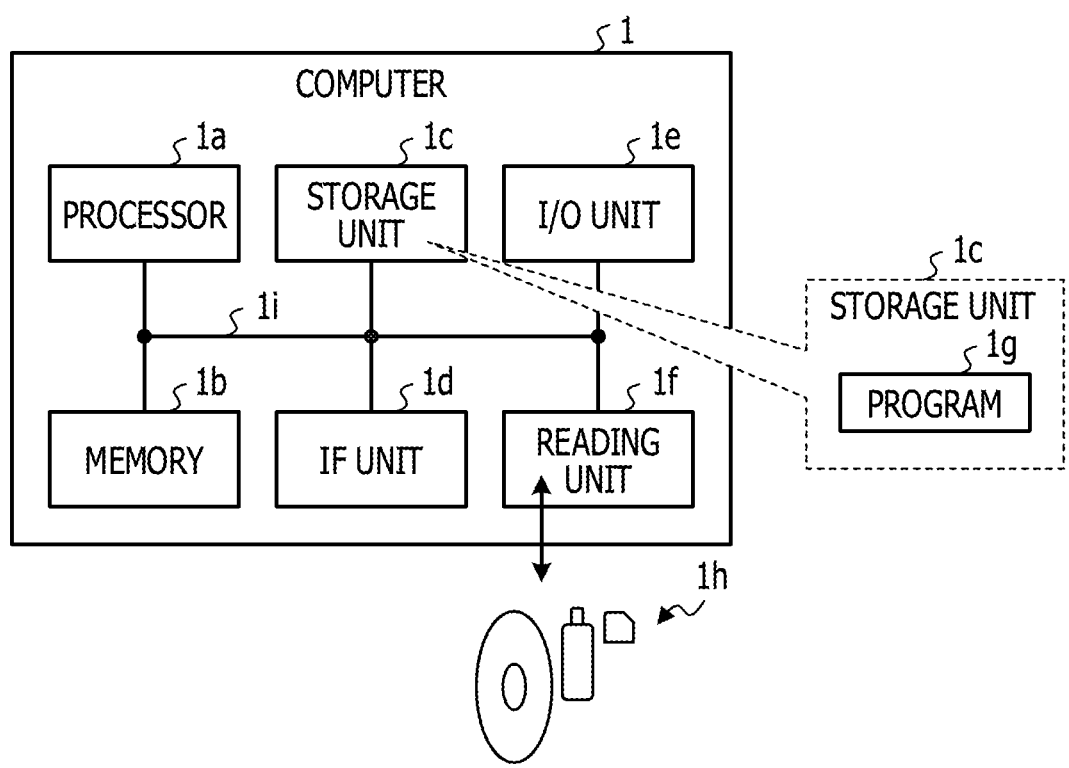
FIG. 8 is a block diagram illustrating an example of a hardware configuration of a computer according to a first embodiment.

FIG. 8 is a block diagram illustrating an example of a hardware configuration of a computer according to the first embodiment. Incidentally, a computer 1A according to a second embodiment to be described later (see FIG. 16) may also have a hardware configuration similar to that of FIG. 8. The computer 1 illustrated in FIG. 8 may illustratively include, as a hardware configuration, a processor 1a, a memory 1b, a storage unit 1c, an IF unit 1d, an I/O unit 1e, and a reading unit 1f.

The processor 1a is an example of an arithmetic processing device that performs various kinds of control and operation. The processor 1a may be mutually communicatably coupled to each block within the computer 1 by a bus 1i. Incidentally, the processor 1a may be a multiprocessor including a plurality of processors, may be a multi-core processor including a plurality of processor cores, or may be a configuration including a plurality of multi-core processors.

Cited as the processor 1a are integrated circuits (ICs) such as a CPU, an MPU, a GPU, an APU, a DSP, an ASIC, an FPGA, and the like. MPU is an abbreviation of Micro Processing Unit. GPU is an abbreviation of Graphics Processing Unit. APU is an abbreviation of Accelerated Processing Unit. DSP is an abbreviation of Digital Signal Processor. ASIC is an abbreviation of Application Specific IC. FPGA is an abbreviation of Field-Programmable Gate Array.

The memory 1b is an example of hardware storing information such as various kinds of data, programs, and the like. Cited as the memory 1b is a volatile memory such as a dynamic random access memory (DRAM) or the like.

The storage unit 1c is an example of hardware storing information such as various kinds of data, programs, and the like. Cited as the storage unit 1c are various kinds of storage devices including a semiconductor drive device such as an SSD or the like, a magnetic disk device such as a hard disk drive (HDD) or the like, a nonvolatile memory, and the like. Cited as the nonvolatile memory are, for example, a flash memory, a storage class memory (SCM), a read only memory (ROM), and the like.

Incidentally, the storage unit 1c according to the first embodiment may include at least a low-latency SSD. In addition, the storage unit 1c may include a storage device such as another SSD, an HDD, or the like in addition to the low-latency SSD.

In addition, the storage unit 1c may store a program 1g that implements the whole or a part of various functions of the computer 1. The processor 1a of the computer 1 can, for example, implement functions as a processing section 2 to be described later, the processing section 2 being illustrated in FIG. 9, by expanding the program 1g (information processing program) stored in the storage unit 1c into the memory 1b and executing the program 1g. The functions of the processing section 2 may include functions of an OS 21, an I/O-intensive app 22, and a control section 23 to be described later.

The IF unit 1d is an example of a communication IF that performs control or the like of coupling and communication with a network not illustrated. The IF unit 1d may, for example, include an adapter compliant with local area network (LAN), optical communication (for example, fibre channel (FC)), or the like. The program 1g may, for example, be downloaded from the network to the computer 1 via the communication IF, and stored in the storage unit 1c.

The I/O unit 1e may include one of or both an input unit such as a mouse, a keyboard, an operating button, or the like and an output unit such as a touch panel display, a monitor such as a liquid crystal display (LCD) or the like, a projector, a printer, or the like.

The reading unit if is an example of a reader that reads information of data and a program recorded on a recording medium 1h. The reading unit 1f may include a coupling terminal or a device that the recording medium 1h may be coupled to or inserted into. Cited as the reading unit 1f are, for example, an adapter compliant with universal serial bus (USB) or the like, a drive device making access to a recording disk, and a card reader making access to a flash memory such as an SD card or the like. Incidentally, the recording medium 1h may store the program 1g, and the reading unit 1f may read the program 1g from the recording medium 1h and store the program 1g in the storage unit 1c.

Cited as the recording medium 1h is illustratively a non-transitory recording medium such as a magnetic/optical disk, a flash memory, or the like. Cited as the magnetic/optical disk are illustratively a flexible disk, a compact disc (CD), a digital versatile disc (DVD), a Blu-ray Disk, a holographic versatile disc (HVD), and the like. Cited as the flash memory are illustratively a USB memory, an SD card, and the like. Incidentally, cited as the CD are illustratively a CD-ROM, a CD-R, a CD-RW, and the like. In addition, cited as the DVD are illustratively a DVD-ROM, a DVD-RAM, a DVD-R, a DVD-RW, a DVD+R, a DVD+RW, and the like.

The hardware configuration of the computer 1 described above is illustrative. Hence, increasing or decreasing of hardware within the computer 1 (for example, addition or deletion of an arbitrary block), division thereof, integration thereof in an arbitrary combination, or addition, omission, or the like of a bus may be performed as appropriate.

[1-2-2] Example of Functional Configuration

Figure 9:
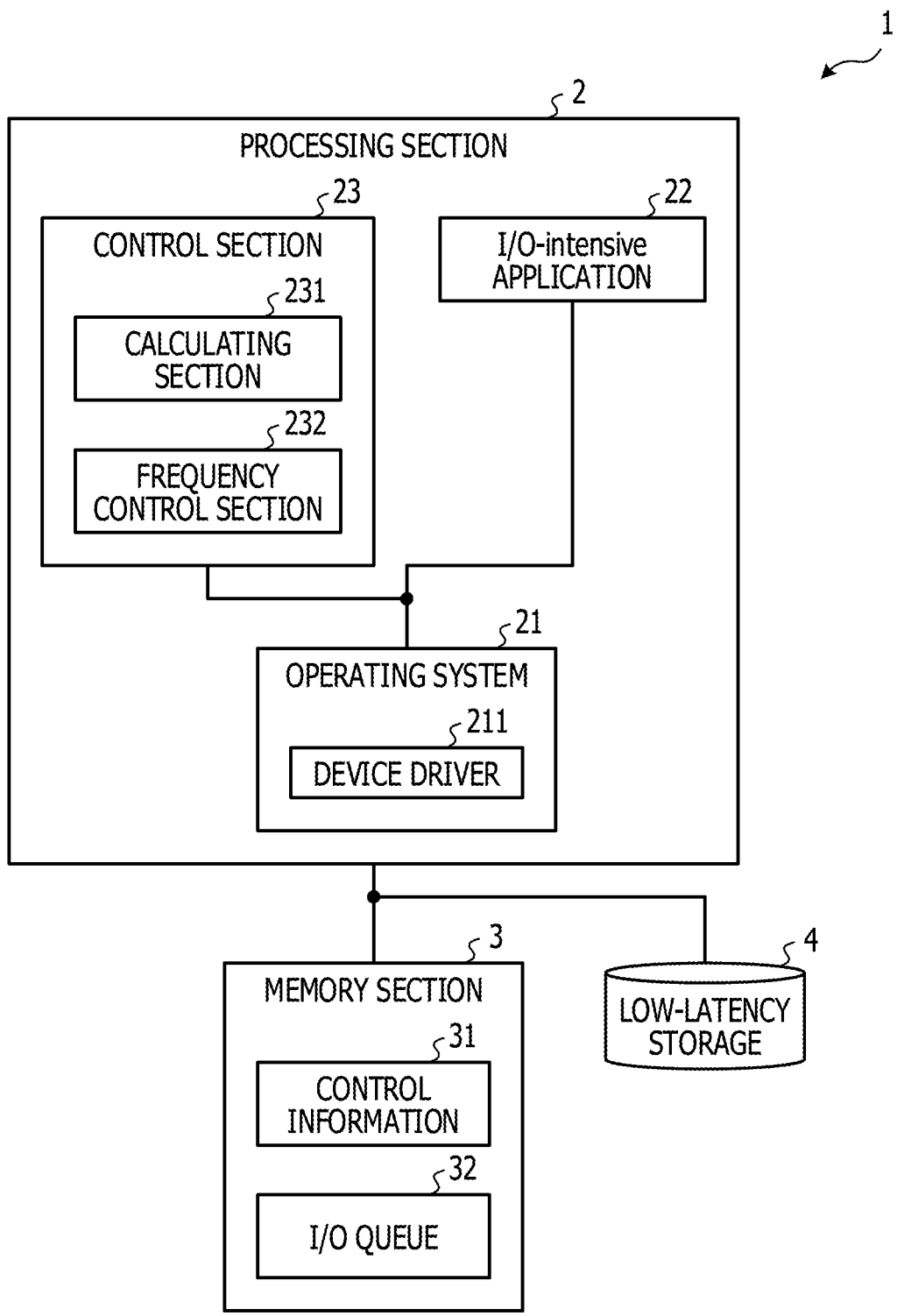
FIG. 9 is a block diagram illustrating an example of a functional configuration of a computer according to the first embodiment.

FIG. 9 is a block diagram illustrating an example of a functional configuration of a computer according to the first embodiment. The computer 1 illustrated in FIG. 9 is an example of an information processing device. Cited as the computer 1 are various kinds of processing devices such as a personal computer (PC), a tablet, a smart phone, a server, a mainframe, and the like. As illustrated in FIG. 9, the computer 1 may illustratively include a processing section 2, a memory section 3, and a low-latency storage 4.

The memory section 3 is an example of a retaining unit that stores various kinds of information used for the control of the computer 1. The memory section 3 may illustratively store control information 31 and an I/O queue 32.

The control information 31 is information used for the control of a control section 23 to be described later. Incidentally, the control information 31 may include, for example, a received parameter and a parameter used for the processing of an OS 21.

The I/O queue 32 is an example of a queue that stores access requests issued to the low-latency storage 4 by the OS 21 and an I/O-intensive app 22. The I/O queue 32 is, for example, a storage area used by a device driver 211 as a buffer that temporarily stores commands for I/O access to the low-latency storage 4 and data.

The memory section 3 may be implemented by one or more storage units, and a disk array such as a redundant array of inexpensive disks (RAID) or the like may be formed by a plurality of storage units. The memory section 3 may be implemented by a storage area of at least one of the memory 1b and the storage unit 1c illustrated in FIG. 8. Suppose in the first embodiment that the memory section 3 is implemented by a storage area of the memory 1b such as a DRAM or the like.

The low-latency storage 4 is an example of a storage or a device (storage device). The low-latency storage 4 may store various kinds of data. As an example, the low-latency storage 4 may store system data of the OS 21 and the I/O-intensive app 22 to be described later or the like and user data of documents, multimedia, and the like.

Cited as the low-latency storage 4 is a low-latency SSD such as an Intel Optane SSD (registered trademark) adopting a 3D XPoint (registered trademark) technology or the like. The low-latency storage 4 has a low access latency, for example, a small processing time (delay time) or response time of device processing, for example, a latency of approximately a few µs to 20 µs, or a latency of 10 µs or less as an example. The low-latency storage 4 is an example of the storage unit 1c illustrated in FIG. 8. Incidentally, in addition to the low-latency storage 4, a storage device as an example of the storage unit 1c may be incorporated in the computer 1 or coupled to the computer 1.

The processing section 2 is functions implemented by the processor 1a of the computer 1 illustrated in FIG. 8 by executing the program 1g expanded in the memory 1b. The processing section 2 may illustratively include an OS (operating system) 21, an I/O-intensive application 22, and a control section 23.

The OS 21 is an example of basic software that manages and controls the computer 1. The OS 21 is software that enables various applications to use hardware resources and/or software resources of the computer 1.

The OS 21 may illustratively include the device driver 211. The device driver 211 is software for enabling hardware resources of the computer 1 to be controlled by the OS 21. The device driver 211 may include a device driver for the low-latency storage 4 to enable the low-latency storage 4 to be controlled by the OS 21.

The I/O-intensive app 22 is an example of application software that operates under control of the OS 21. The I/O-intensive app 22 may make access of highly frequent I/O, for example, synchronous I/O, to the low-latency storage 4. The highly frequent I/O such as the synchronous I/O or the like is access imposing a load on I/O processing in the OS 21 and the low-latency storage 4, though the I/O-intensive app 22 itself has a short processing time.

As described above, the OS 21 and the I/O-intensive app 22 are an example of an access section that makes access to the low-latency storage 4.

The control section 23 may control access processing performance, the power consumption of the processor 1a, and the like through the control of the processor 1a. The control section 23 may illustratively include a calculating section 231 and a frequency control section 232. Details of the calculating section 231 and the frequency control section 232 will be described later.

[1-3] Description of Control Section

Description will next be made of the control section 23 according to the first embodiment.

As described above, in an existing CPU, it takes a time of a few tens of μs or the like to change operating frequency. Accordingly, the control section 23 performs frequency control at intervals of a fixed time in which the operating frequency of the processor 1a may be changed. The fixed time is a time substantially equal to or more than a few tens of μs, which is a time taken to change the operating frequency, and may be illustratively a time in a range of approximately a few hundreds of μs to a few hundreds of ms.

Incidentally, the frequency control may be performed in core units of the processor 1a. The control of the operating frequency of the processor 1a will hereinafter mean controlling the operating frequency of cores in core units of the processor 1a.

In the frequency control, the control section 23 may decrease the operating frequency of the processor 1a only when the performance of an application, for example, the I/O-intensive app 22 is not affected. For example, when the operating frequency of the processor 1a is decreased, the processing time of the OS 21 is increased. However, the control section 23 may perform decreasing control of the operating frequency only in one or both of the following cases (a) and (b) in which a decrease in the operating frequency of the processor 1a does not affect performance.

(a) a case where the low-latency storage 4 itself is a bottleneck in performance.

(b) a case where the time of OS processing performed by the processor 1a does not affect performance.

The control section 23 may dynamically control the operating frequency according to a state of usage of the low-latency storage 4.

Figure 10:
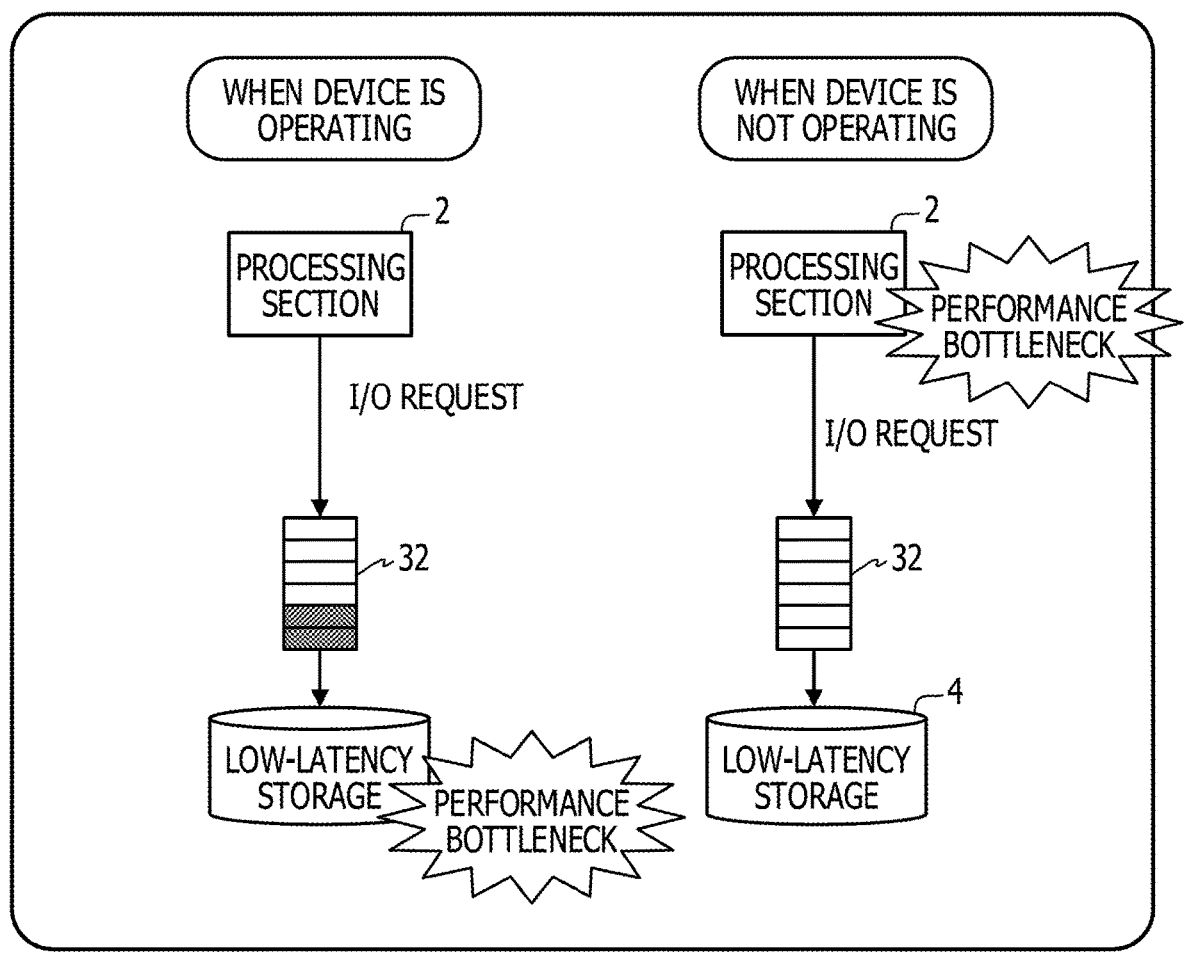
FIG. 10 is a diagram illustrating an example of relation between a state of usage of a device and a performance bottleneck.

FIG. 10 is a diagram illustrating an example of relation between a state of usage of a device and a performance bottleneck.

When the low-latency storage 4 is performing device processing in response to an access request transmitted from the processing section 2, for example, an I/O request, for example, the low-latency storage 4 may be said to be in an operational state. In addition, as illustrated in FIG. 10, when I/O requests waiting for device processing to be performed by the low-latency storage 4 are accumulated in the I/O queue 32, the low-latency storage 4 is a bottleneck in access performance, and thus the condition of (a) described above is satisfied.

In addition, in this case, the OS processing waits for completion of the I/O requests accumulated in the I/O queue 32 by the IRQ or polling illustrated in FIG. 2. Hence, until the device processing for the I/O requests is completed, the time of the OS processing performed in the processing section 2 does not affect performance, and thus the condition of (b) described above is satisfied.

When the control section 23 detects that the low-latency storage 4 itself is a bottleneck in performance, for example, the control section 23 may reduce the power consumption of the processor 1a by performing decreasing control of the operating frequency of the processor 1a.

On the other hand, when the low-latency storage 4 is not performing the device processing, the low-latency storage 4 may be said to be in a non-operational state with regard to processing for the I/O requests. As illustrated in FIG. 10, when the I/O queue 32 is empty, a processing wait occurs in the low-latency storage 4, and therefore the processing section 2 (for example, the processor 1a) is a bottleneck in access performance.

When the processor 1a is a bottleneck in performance, for example, the control section 23 may perform increasing control of the operating frequency, and thereby increase the performance of the application (for example, the I/O-intensive app 22). As an example, when the processor 1a is a bottleneck in performance, the control section 23 may set the operating frequency to a maximum, and thereby maximize the performance of the application.

Here, a device utilization rate of the low-latency storage 4 is cited as a non-restrictive example of the state of usage of the low-latency storage 4. The device utilization rate illustratively corresponds to a result of calculation of a ratio (%) of a device operating time per unit time.

For example, the calculating section 231 of the control section 23 may calculate a ratio of a residence time of the I/O requests to a unit time as the device utilization rate.

The residence time is an example of the control information 31. The residence time is information indicating a time for which at least one I/O request resides in the I/O queue 32 of the device driver 211. In a case where the OS 21 is Linux (registered trademark), for example, the residence time is indicated by a parameter of "io_ticks" recorded in a "/sys/block/<dev>/stat" file by the OS 21.

The calculating section 231 may, for example, read "io_ticks" from the above-described file in given timing, calculate a difference between a measurement start time of "io_ticks" and a present time, and calculate a ratio of "io_ticks" to the calculated difference as the device utilization rate.

Thus, the calculating section 231 is an example of a monitoring unit that monitors the state of usage of the low-latency storage 4 in given timing.

The frequency control section 232 may detect a component as a factor of a performance bottleneck by determining whether or not the device utilization rate calculated by the calculating section 231 is less than a given threshold value (for example, 100% or the like). The frequency control section 232 may then perform decreasing control or increasing control of the operating frequency of the processor 1a as described above according to the detected component.

Figure 11A:
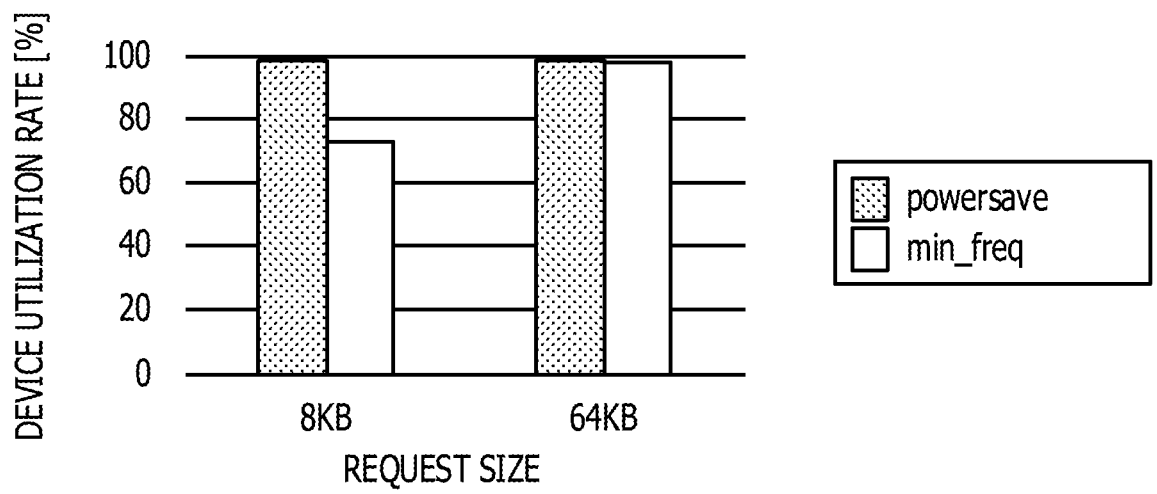
FIGS. 11A and 11B are diagrams illustrating an example of relation of request size to a device utilization rate and throughput.
Figure 11B:
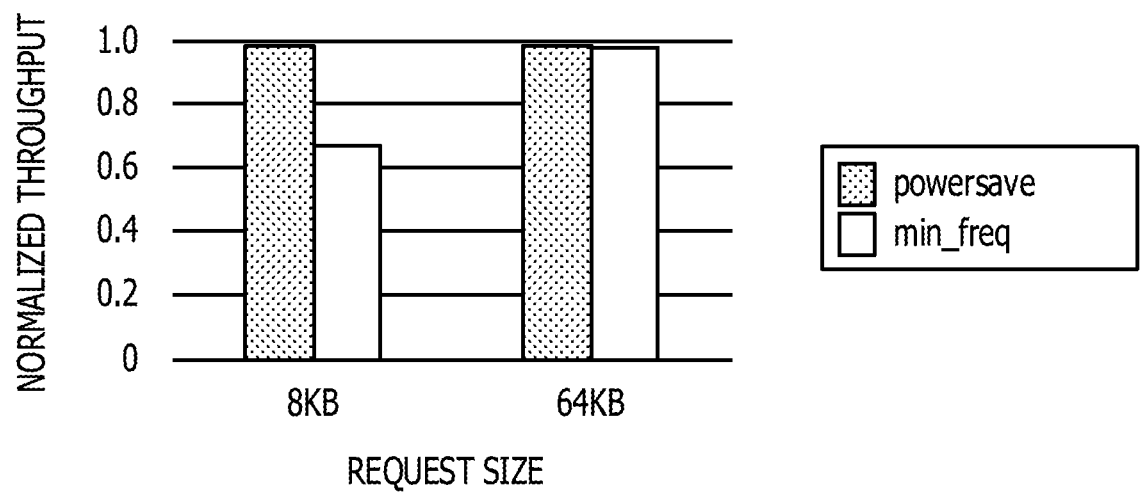

FIGS. 11A and 11B are diagrams illustrating an example of relation of request size to a device utilization rate and throughput. Incidentally, the operating policy "min_freq" illustrated in FIGS. 11A and 11B corresponds to a case where decreasing control of the operating frequency is performed by control of the frequency control section 232.

As illustrated in FIGS. 11A and 11B, when the device utilization rate is less than the given threshold value as a result of control that decreases the operating frequency to "min_freq" (see "8 KB" in FIG. 11A), a decrease in throughput occurs (see "8 KB" in FIG. 11B). Incidentally, in the following description, for convenience, suppose that the given threshold value is 100%.

On the other hand, when the device utilization rate is not decreased as a result of the control that decreases the operating frequency to "min_freq" (see "64 KB" in FIG. 11A), the throughput is not decreased (see "64 KB" in FIG. 11B).

Thus, the larger the request size, the longer the processing time of device processing by the low-latency storage 4, and hence the longer the residence time of I/O requests in the I/O queue 32. Therefore, even when the processing time of the OS processing is increased by the decreasing control of the operating frequency, the larger the request size, the smaller a possibility that the device utilization rate is decreased due to a wait for performance of the device processing.

FIG. 12 is a diagram illustrating an example of relation between operating frequency and a device utilization rate. Incidentally, FIG. 12 assumes a case where the processor 1a has a "core 0" and a "core 1." An upper part of FIG. 12 illustrates an example of processing of the core 0 and the core 1 in a case where the device utilization rate is less than 100% due to a decrease in the operating frequency as in the case where the request size is 8 KB (see FIGS. 11A and 11B). In addition, a lower part of FIG. 12 illustrates an example of processing of the core 0 and the core 1 in a case where the device utilization rate is not decreased due to a decrease in the operating frequency as in the case where the request size is 64 KB (see FIGS. 11A and 11B).

As illustrated in the upper part of FIG. 12, when the device utilization rate is less than 100% due to a decrease in the operating frequency of both the core 0 and the core 1, the access time of both the core 0 and the core 1 is increased by an increase in the OS processing time due to the decrease in the operating frequency. Incidentally, such a situation corresponds to a case where the condition of (b) or (a) and (b) described above is not satisfied.

On the other hand, as illustrated in the lower part of FIG. 12, in the case where the device utilization rate is not decreased due to the decrease in the operating frequency of both the core 0 and the core 1, the access time of both the core 0 and the core 1 is not increased even when the OS processing time is increased due to the decrease in the operating frequency. Incidentally, such a situation corresponds to a case where the condition of (a) and (b) described above is satisfied.

In the example of the lower part of FIG. 12, in both the core 0 and the core 1, "In queue" as a time of a wait for completion of the device processing is included in the OS processing before the decrease in the operating frequency. On the other hand, after the decrease in the operating frequency, in the OS processing time, the processing time of "OS" and "App" is increased, and the time and resources of "In queue" are consumed. Thus, a reduction in power consumption in the core 0 and the core 1 is achieved in a state in which an increase in the OS processing time is suppressed.

For example, at "Low freq." (after the decrease in the operating frequency) in the lower part of FIG. 12, "I/O wait" of the core 0 or the core 1 is temporally continuous, and "I/O wait" is performed without a break between the core 0 and the core 1. Thus, in a time period illustrated in FIG. 12, even after the decrease in the operating frequency, the low-latency storage 4 continues to operate, so that a device utilization rate=100% is achieved.

As described above, the frequency control section 232 is an example of a control section that performs control of changing the operating frequency of the processor 1a performing the processing of the OS 21 and the I/O queue 32 according to a result of monitoring by the calculating section 231.

As described above, the operating policies ("performance," "powersave," and "min_freq" or the like) of the processor of the CPU or the like control the operating frequency of the processor according to the usage state such as a load on the processor or the like, as illustrated in FIGS. 5A and 5B and FIGS. 6A and 6B and the like. For example, the operating frequency of the processor is controlled according to the state of usage of the processor as a control object.

On the other hand, the first embodiment may predict whether or not the OS processing time increased by the decreasing control of the operating frequency, for example, affects performance by directing attention to the state of usage of the low-latency storage 4 rather than the state of usage of the processor 1a as a control object. For example, it is possible to predict whether or not the processor 1a becomes a performance bottleneck (whether or not the low-latency storage 4 continues to be a performance bottleneck) when the decreasing control of the operating frequency is performed. Incidentally, it is difficult to realize such a "prediction" based on the state of usage of the processor 1a.

Thus, the control section 23 according to the first embodiment monitors the state of usage of the low-latency storage 4, and performs the decreasing control of the operating frequency of the processor 1a according to the usage state (as an example, in a case where the condition of one of or both (a) and (b) described above is satisfied). It is thereby possible to achieve both of an improvement in performance of access to the low-latency storage 4 in the computer 1 and a reduction in the power consumption of the processor 1a in access to the low-latency storage 4, as described with reference to FIGS. 11A and 11B and FIG. 12 and the like.

In addition, the control section 23 according to the first embodiment performs increasing control of the operating frequency of the processor 1a according to the state of usage of the low-latency storage 4 (as an example, in a case where the condition of one of or both (a) and (b) described above is not satisfied). It is thereby possible to shorten the OS processing time, and improve the performance of access to the low-latency storage 4.

Incidentally, the state of usage of the device, for example, the device utilization rate may be obtained based on other information in place of the storage time of I/O requests in the I/O queue 32. For example, the device utilization rate may be calculated or derived based on information such as the number of queue waits in the I/O queue 32, the busy rate of the low-latency storage 4 in a fixed time, the presence or absence of a busy response from the low-latency storage 4, or the like.

For example, the frequency control section 232 may determine whether or not the number of queue waits in the I/O queue 32 exceeds a given threshold value, whether or not the busy rate is equal to or higher than a given threshold value, or whether or not there is a busy response within a given period. Incidentally, the frequency control section 232 may determine that the utilization rate of the low-latency storage 4 exceeds a threshold value (the low-latency storage 4 is a performance bottleneck) when the number of waits in the queue exceeds the given threshold value, when the busy rate is equal to or higher than the given threshold value, or when there is a busy response within the given period.

Incidentally, the following processing may be performed for the case where the device utilization rate is calculated or derived based on the number of waits in the queue.

In the description of the upper part of FIG. 12, a case where the request size is 8 KB (see FIGS. 11A and 11B) is cited as an example of a case where the device utilization rate is less than 100% due to a decrease in the operating frequency. However, there is no limitation to this. Even in a case where the request size is a small size such as 8 KB, when there are a large number of queue waits in the I/O queue 32 and "In queue" is included in the OS processing, the device utilization rate may not be decreased by a decrease in the operating frequency, as illustrated in the lower part of FIG. 12.

Therefore, the frequency control section 232 may set the given threshold value for the number of waits in the queue according to the request size (for example, such that a value obtained by multiplying the request size and the given threshold value together is a fixed size). The fixed size is, for example, a size such that the device utilization rate is not decreased even when the operating frequency is decreased.

In addition, the following processing may be performed for the case where the device utilization rate is calculated or derived based on the busy rate of the low-latency storage 4.

For example, the busy rate of the low-latency storage 4 may be calculated based on the bandwidth of the low-latency storage 4. The bandwidth is information indicating a data transfer rate (for example, writing throughput) in the low-latency storage 4. As in the description of FIGS. 11A and 11B described above, as the request size is increased, the processing time of the device processing by the low-latency storage 4 is lengthened, and therefore the bandwidth of the low-latency storage 4 is increased (saturated when exceeding a fixed value). Hence, even when the decreasing control of the operating frequency increases the processing time of the OS processing, the larger the request size, the smaller a possibility that the device utilization rate is decreased due to a wait for performance of the device processing.

Figure 13A:
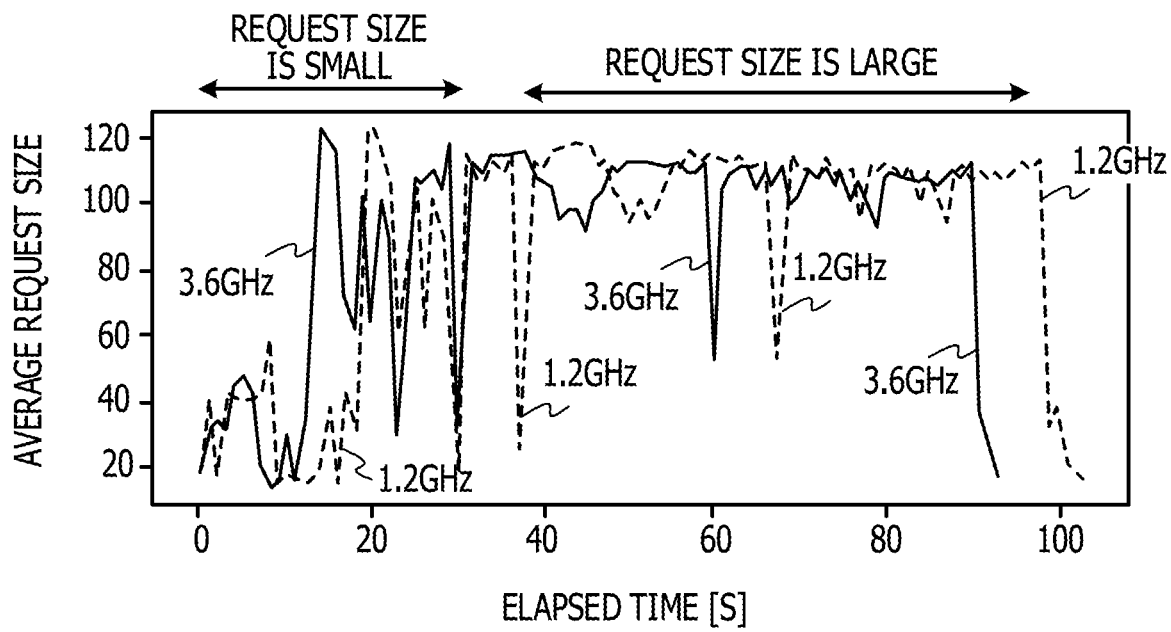
FIGS. 13A and 13B are diagrams illustrating an example of relation between average request size and writing throughput.
Figure 13B:
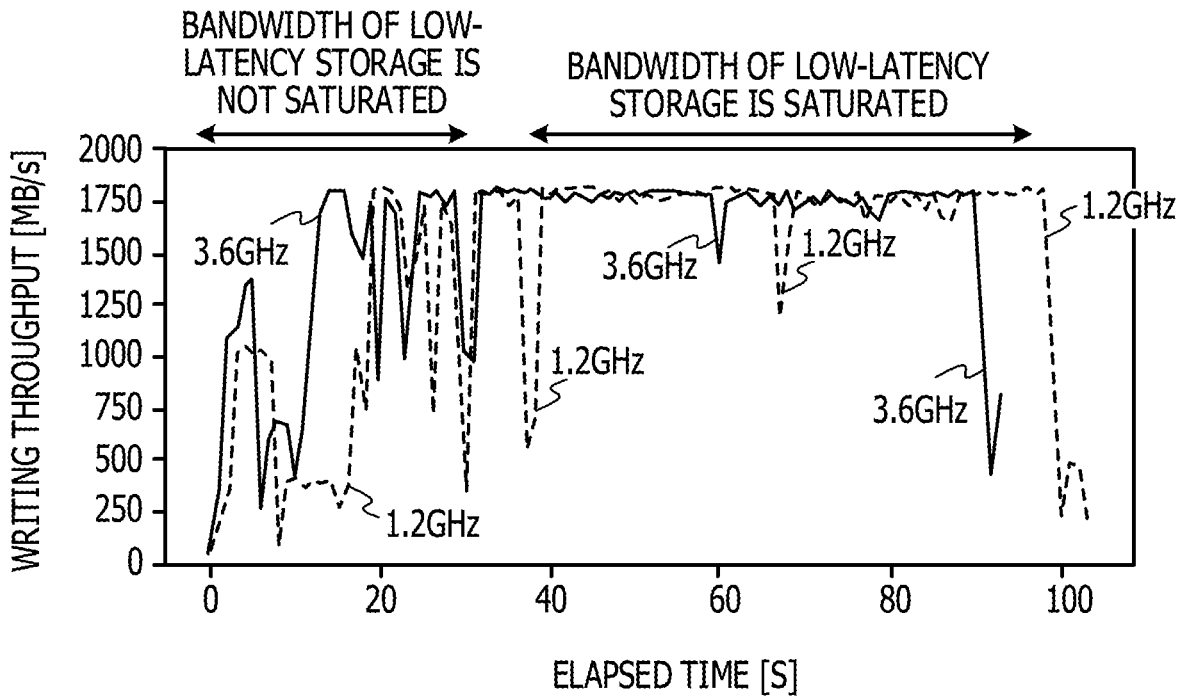

FIGS. 13A and 13B are diagrams illustrating an example of relation between average request size and writing throughput. FIGS. 13A and 13B illustrate a graph in a case where the operating frequency of the processor 1a is "1.2 GHz" and a graph in a case where the operating frequency of the processor 1a is "3.6 GHz" (maximum value as an example). In a time interval in FIG. 13B, the time interval corresponding to a time interval labeled with "REQUEST SIZE IS SMALL" as illustrated in FIG. 13A, the bandwidth is not saturated.

On the other hand, the bandwidth is saturated in a time interval in FIG. 13B, the time interval corresponding to a time interval labeled with "REQUEST SIZE IS LARGE" as illustrated in FIG. 13A. Incidentally, suppose that in the example of FIGS. 13A and 13B, the bandwidth represented as the writing throughput is saturated at approximately 1800 (MB/s).

As illustrated in FIG. 13B, in a case where the request size is large to such a degree that the bandwidth of the low-latency storage 4 is saturated, the bandwidth continues to be saturated even when the operating frequency of the processor 1a is decreased from "3.6 GHz" to "1.2 GHz." In this case, even when the decreasing control of the operating frequency increases the processing time of the OS processing, there is a reduced possibility that the device utilization rate is decreased due to a wait for performance of the device processing. For example, this case corresponds to a case where the condition of one of or both (a) and (b) described above is satisfied.

From the above, the frequency control section 232 may, for example, calculate a ratio of the bandwidth to a maximum value (saturation value) as the busy rate, and perform the decreasing control of the operating frequency when the ratio is equal to or more than a given threshold value (100% as a non-restrictive example). When the ratio is less than the given threshold value, on the other hand, the frequency control section 232 may perform the increasing control of the operating frequency. Incidentally, the frequency control section 232 may perform comparison between the bandwidth and a threshold value of a transfer rate, for example, in place of the comparison between the busy rate and the given threshold value.

[1-4] Example of Operation of Computer according to First Embodiment

Next, referring to FIG. 14 and FIG. 15, description will be made of an example of operation of the computer 1 according to the first embodiment configured as described above.

Incidentally, in the first embodiment, "interval" and "dec_thr" may be input as input parameters to the processing section 2 of the computer 1. "interval" is a parameter defining a fixed time as a time interval at which the operating frequency control is performed. "dec_thr" is a parameter defining a given threshold value of the device utilization rate for allowing a decrease in the operating frequency.

"interval" and "dec_thr" may be transmitted from a computer such as a managing terminal not illustrated or the like via a network. The processing section 2 may store the received parameters as the control information 31 in the memory section 3.

In the following, as an assumption, suppose that the OS 21 and the low-latency storage 4 perform access processing according to a request from the I/O-intensive app 22 (see (i-1) and (i-2) in FIG. 15).

Figure 14:
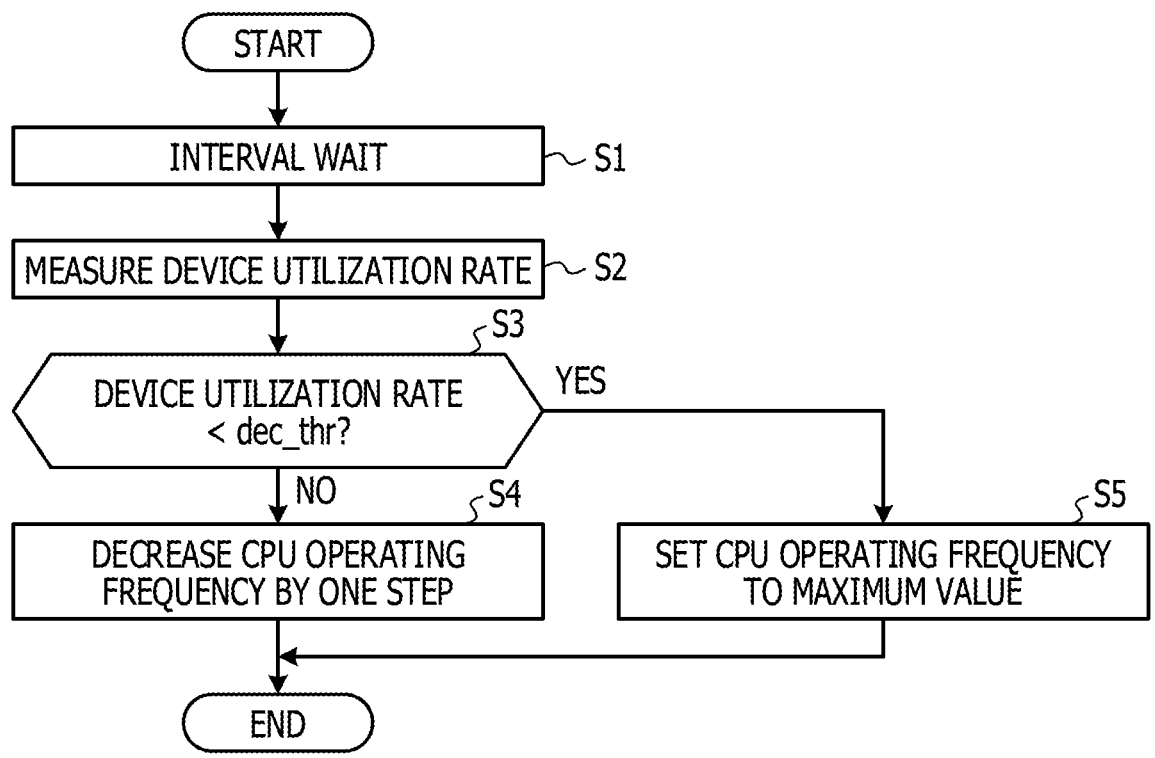
FIG. 14 is a flowchart illustrating an example of operation of a computer according to the first embodiment.

As illustrated in FIG. 14, the control section 23 in the processing section 2 of the computer 1 extracts "interval" as the parameter defining a waiting time from the control information 31 of the memory section 3, and waits for a fixed time according to the extracted "interval" (step S1).

Figure 15:
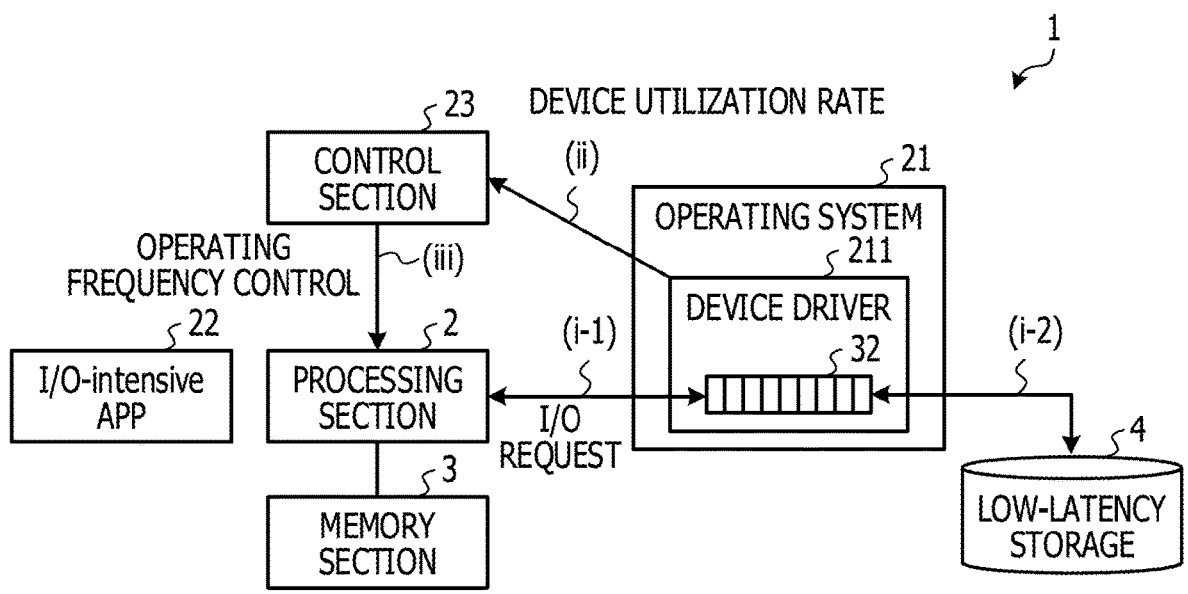
FIG. 15 is a block diagram illustrating an example of operation of a computer according to the first embodiment.

After the passage of the fixed time, the calculating section 231 of the control section 23 measures the device utilization rate (step S2; see (ii) in FIG. 15). For example, the calculating section 231 may extract "io_ticks" as a parameter related to the I/O queue 32 from the control information 31, and calculate the device utilization rate of the device driver 211 based on the extracted "io_ticks." Incidentally, "io_ticks" may be stored as system data of the OS 21 in the low-latency storage 4 as an example of a storage. In this case, the calculating section 231 may extract "io_ticks" from the low-latency storage 4 via the device driver 211.

Next, the frequency control section 232 extracts "dec_thr" as the parameter defining the given threshold value from the control information 31 of the memory section 3, and determines whether or not the device utilization rate is less than the extracted "dec_thr" (step S3).

When the frequency control section 232 determines that the device utilization rate is not less than "dec_thr" (is equal to or more than "dec_thr") (No in step S3), the frequency control section 232 performs control so as to decrease the operating frequency of the processor 1a by one step (step S4). One cycle of the operating frequency control is then ended.

When the frequency control section 232 determines that the device utilization rate is less than "dec_thr" (Yes in step S3), on the other hand, the frequency control section 232 increases the operating frequency of the processor 1a, for example, sets the operating frequency of the processor 1a to a maximum value (step S5). One cycle of the operating frequency control is then ended.

The frequency control section 232 thus performs the operating frequency control of the processor 1a in steps S4 and S5 according to a result of determination in step S3 (see (iii) in FIG. 15).

Incidentally, after an end of step S4 or S5, the processing may proceed to step S1. In addition, in a case where the processor 1a is a multi-core processor, the processing illustrated in FIG. 14 may be performed for each core.

2 Second Embodiment

A second embodiment will next be described.

In the first embodiment, description has been made supposing that the control section 23 controls the operating frequency of the processor 1a at given (for example, specified) intervals. However, the control of the operating frequency may not need to be performed while the low-latency storage 4 continues operating.

Accordingly, in the second embodiment, description will be made of a method of setting the period (time) of an interval longer than a given interval according to a result of predicting the operational state of the low-latency storage 4.

In addition, in the first embodiment, description has been made supposing that the control section 23 performs control of decreasing the operating frequency stepwise based on the device utilization rate of the low-latency storage 4 at each time point. Such stepwise control of the operating frequency may suppress a decrease in performance when the device utilization rate is decreased.

In the second embodiment, description will be made of a method of minimizing the operating frequency immediately rather than stepwise according to a result of predicting the operational state of the low-latency storage 4 (for example, a time for which the low-latency storage 4 continues operating).

[2-1] Example of Configuration of Second Embodiment

Figure 16:
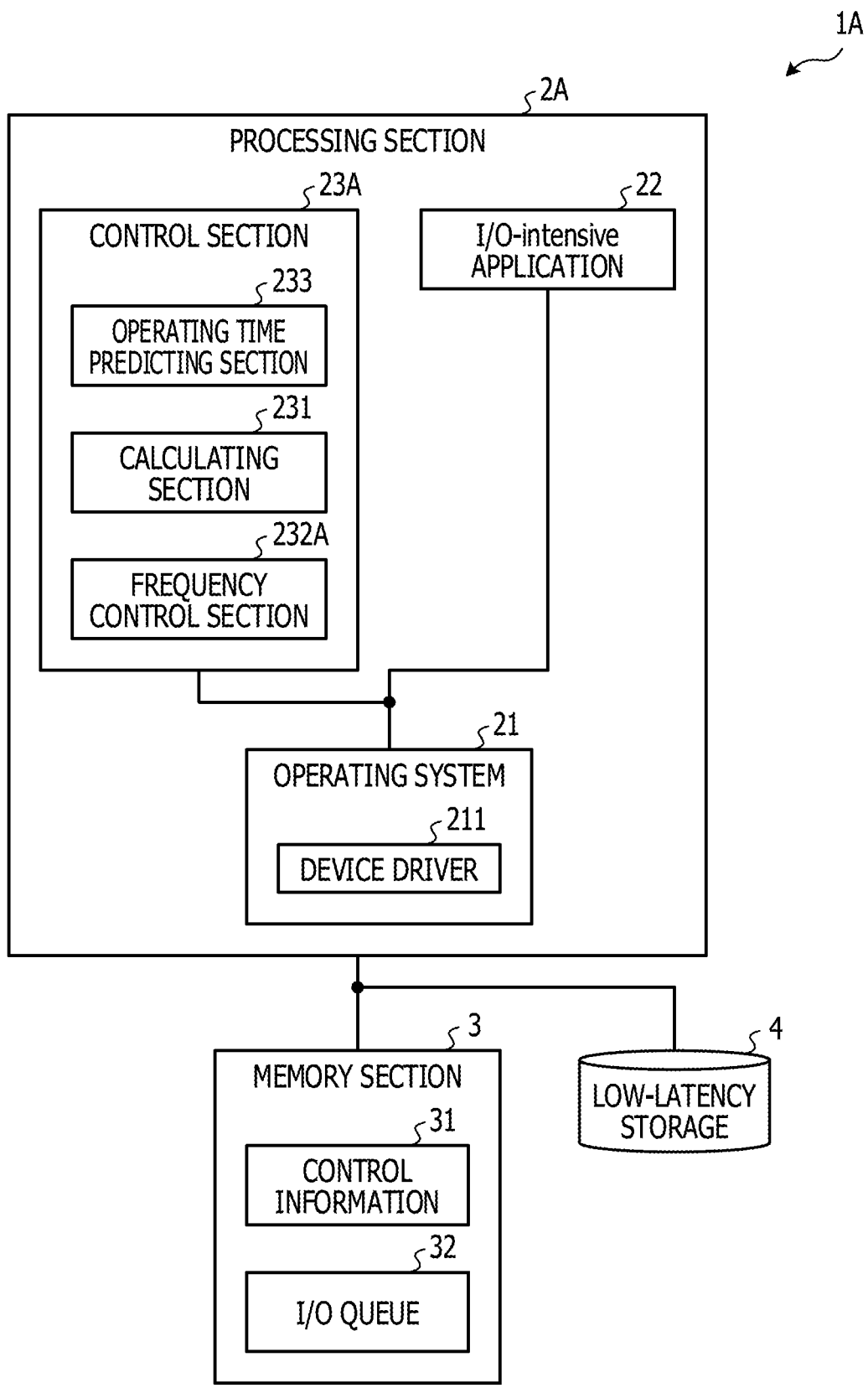
FIG. 16 is a block diagram illustrating an example of a functional configuration of a computer according to a second embodiment.

FIG. 16 is a block diagram illustrating an example of a functional configuration of a computer according to the second embodiment. Incidentally, the functional configuration and hardware configuration of a computer 1A may be similar to the functional configuration and hardware configuration of the computer 1 according to the first embodiment unless otherwise mentioned in the following.

The computer 1A according to the second embodiment may include a processing section 2A, a memory section 3, and a low-latency storage 4, as illustrated in FIG. 16.

The processing section 2A is a function implemented by a processor (processor 1a; see FIG. 8) of the computer 1A by executing the program 1g expanded in the memory 1b. The processing section 2A may be regarded as a configuration obtained by replacing the control section 23 with a control section 23A in the processing section 2 according to the first embodiment.

As illustrated in FIG. 16, the processing section 2A according to the second embodiment may include an OS 21, an I/O-intensive app 22, and the control section 23A.

The control section 23A may control access processing performance, the power consumption of the processor 1a, and the like through the control of the processor 1a. The control section 23A may illustratively include a calculating section 231, a frequency control section 232A, and an operating time predicting section 233.

As in the first embodiment, the calculating section 231 is an example of a monitoring section that monitors the state of usage of the low-latency storage 4 in given timing.

The operating time predicting section 233 predicts an operating time (device operating time) of the low-latency storage 4 from each time point, and outputs the predicted operating time to the frequency control section 232A as an operating frequency control mechanism. It is thereby possible to achieve setting of an appropriate interval and immediate minimization of operating frequency. The operating time (device operating time) is an example of a processing time of access by the low-latency storage 4.

Incidentally, each time point is timing of control performed by the control section 23A, and, in the second embodiment, corresponds to given timing that arrives at intervals of a fixed time (a waiting time, or an interval). In the second embodiment, the given timing may be controlled variably by the frequency control section 232A based on a monitoring result of the calculating section 231 and the operating time predicted by the operating time predicting section 233. For example, the given timing may include timing obtained by adding a given time to the timing of control performed by the frequency control section 232A, and the given time may be changed by the frequency control section 232A.

Figure 17:
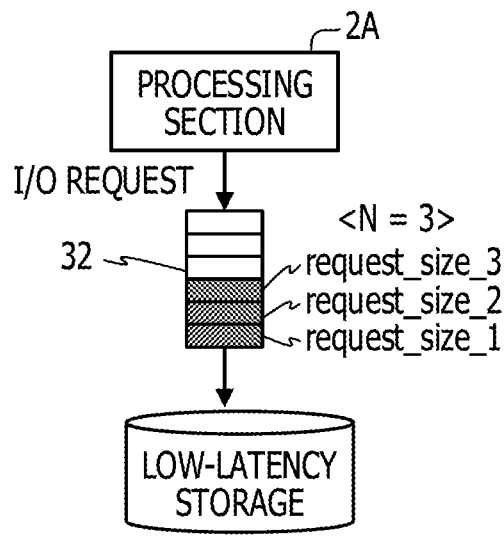
FIG. 17 is a diagram illustrating an example of a device operating time prediction model.

The operating time predicting section 233 may predict the device operating time based on a prediction model. FIG. 17 is a diagram illustrating an example of a prediction model of a device operating time.

Here, a time for which the low-latency storage 4 processes an I/O request is proportional to the requested data size of the I/O request. In addition, the device operating time from a present point in time is a sum total of the processing times of all requests stored in the I/O queue 32.

Hence, the device operating time T may be expressed by the prediction model illustrated in FIG. 17 and the following Equation (1) based on a state of storage of access requests in the I/O queue 32.

$$\text{Device Operating time } T = \Sigma_{i=1}^{N} a \times \text{request\_size\_i} \quad (1)$$

In the above Equation (1), "N" denotes a total number of I/O requests stored in the I/O queue 32, and "request_size_i" denotes the requested data size of each I/O request. The operating time predicting section 233 may obtain each of N and request_size_i based on parameters recorded by the OS 21 or the like.

In addition, in the above Equation (1), "a" denotes a coefficient corresponding to processing performance such as I/O performance or the like with respect to access by the low-latency storage 4. The coefficient may be determined for each requested data size (4 KB, 8 KB, . . . , or the like), for example. Incidentally, the coefficient may be calculated in advance based on a measurement or the like.

In FIG. 17, three I/O requests of "request_size_1," "request_size_2," and "request_size_3" are stored in the I/O queue 32 (N=3). In this case, the device operating time T is a sum total of values obtained by multiplying each of "request_size_1," "request_size_2," and "request_size_3" by the coefficient a corresponding to the requested data size.

Thus, the operating time predicting section 233 is an example of a predicting section that predicts the processing time of access by the low-latency storage 4. The operating time predicting section 233 as an example of the predicting section predicts the processing time based on the state of storage of access requests in the I/O queue 32.

Incidentally, the operating time predicting section 233 may be started, for example, perform processing of predicting the device operating time when the frequency control section 232A to be described later determines that the utilization rate of the low-latency storage 4 is equal to or more than a given threshold value based on a monitoring result of the calculating section 231.

As in the frequency control section 232 in the first embodiment, the frequency control section 232A is an example of a control section that performs control of changing the operating frequency of the processor 1a performing the processing of the OS 21 and the I/O queue 32 according to a monitoring result of the calculating section 231. In addition, the frequency control section 232A according to the second embodiment changes a waiting time (given time) defining timing of control performed by the control section 23A from a default value according to the monitoring result of the calculating section 231.

For example, when the frequency control section 232A determines that the utilization rate of the low-latency storage 4 is equal to or more than the given threshold value based on a monitoring result of the calculating section 231, the frequency control section 232A may set the device operating time predicted by the operating time predicting section 233 as the waiting time.

As an example, when the device operating time is more than the default value of the waiting time, the device operating time more than the default value is set as the waiting time. For example, the interval is set long. Incidentally, the default value corresponds to "interval" as a parameter in the first embodiment.

Thus, the control of the operating frequency may be suppressed from being performed in a period in which the low-latency storage 4 is estimated to continue operating, and overhead due to the control may be reduced as compared with the first embodiment. In addition, a reduction in the power consumption of the processor 1a may be achieved as compared with the first embodiment.

When the device operating time is equal to or less than the default value of the waiting time, on the other hand, the device operating time equal to or less than the default value is set as the waiting time. For example, the interval is set short.

Thus, when the operation of the low-latency storage 4 is estimated to be stalled (the I/O queue 32 becomes empty), the operating frequency of the processor 1a may be controlled (for example, controlled to be raised to a maximum value) immediately without a wait for the passage of the default value. Hence, as compared with the first embodiment, performance of access to the low-latency storage 4 in the computer 1A may be improved.

In addition, the frequency control section 232A may perform control of decreasing the operating frequency to a given value when determining that the utilization rate of the low-latency storage 4 is equal to or more than the given threshold value based on the monitoring result and when determining that the operating time is more than the default value. For example, in this case, the frequency control section 232A may minimize the operating frequency of the processor 1a (set the operating frequency of the processor 1a to a lowest value).

Thus, the frequency control section 232A may minimize the operating frequency of the processor 1a immediately rather than stepwise in timing of determining that the low-latency storage 4 continues operating over a longer time than the default value. For example, it is possible to set the operating frequency to a minimum value by one cycle of decreasing control rather than setting the operating frequency to the minimum value by step-by-step decreasing control over a few cycles. Hence, a reduction in the power consumption of the processor 1a may be achieved as compared with the first embodiment.

Further, when the frequency control section 232A determines that the utilization rate of the low-latency storage 4 is less than the given threshold value based on the monitoring result, the frequency control section 232A may perform control of increasing the operating frequency of the processor 1a, and set the default value as the waiting time (reset the waiting time).

Thus, the control section 23A may perform control similar to that of the first embodiment until the device utilization rate becomes equal to or more than the given threshold value again after a decrease in the device utilization rate.

[2-2] Example of Operation of Computer according to Second Embodiment

Next, referring to FIG. 18 and FIG. 19, description will be made of an example of operation of the computer 1A according to the second embodiment configured as described above.

Incidentally, in the second embodiment, "interval" and "dec_thr" may be input as input parameters to the processing section 2A of the computer 1A as in the first embodiment.

In the following, as an assumption, suppose that the OS 21 and the low-latency storage 4 perform access processing according to a request from the I/O-intensive app 22 (see (i-1) and (i-2) in FIG. 19).

Figure 18:
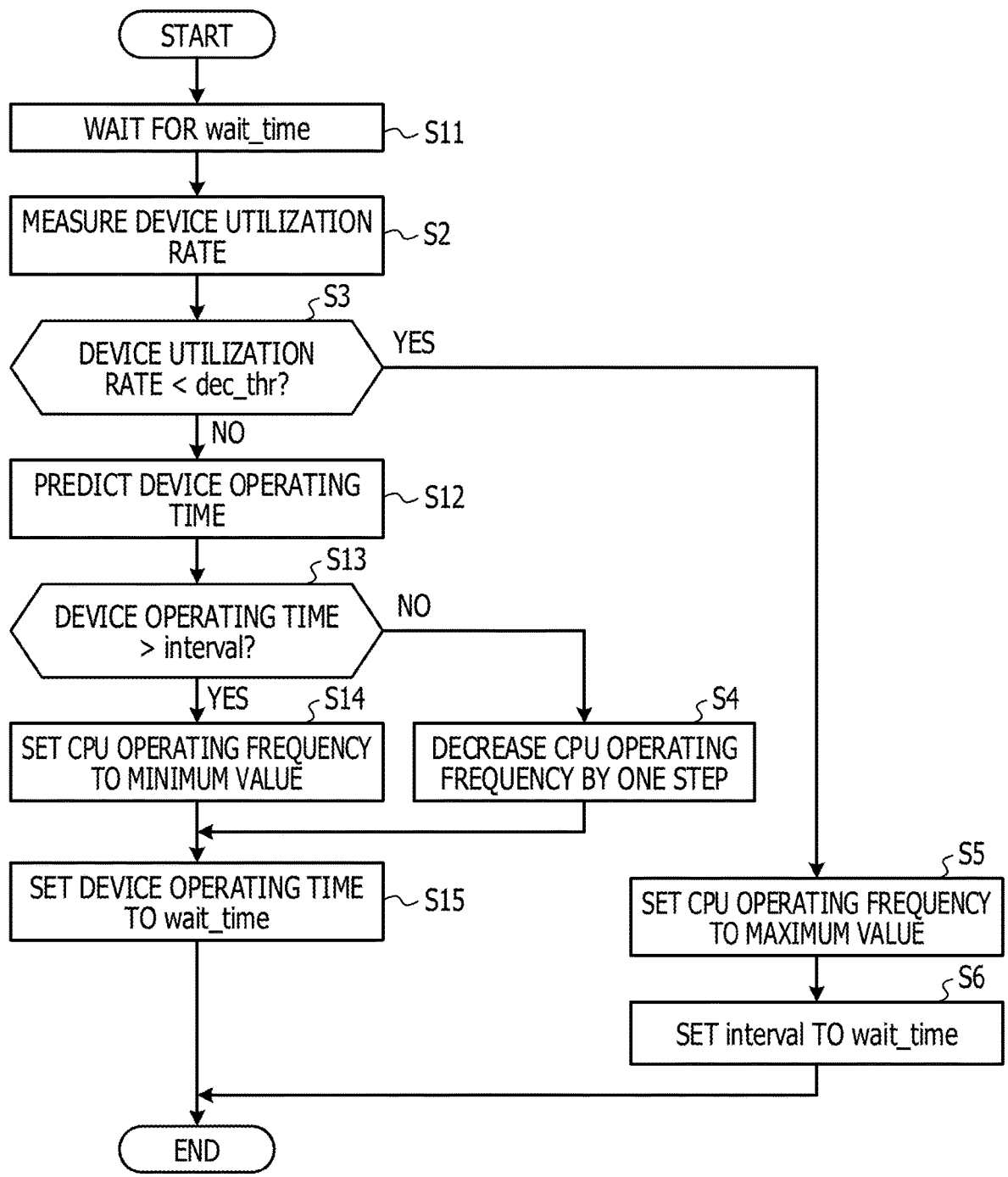
FIG. 18 is a flowchart illustrating an example of operation of a computer according to the second embodiment.

As illustrated in FIG. 18, the control section 23A in the processing section 2A of the computer 1A extracts "interval" as a parameter defining the default value of the waiting time from the control information 31 of the memory section 3. Then, according to the extracted "interval," the control section 23A waits for the waiting time "wait_time" (step S11).

Figure 19:
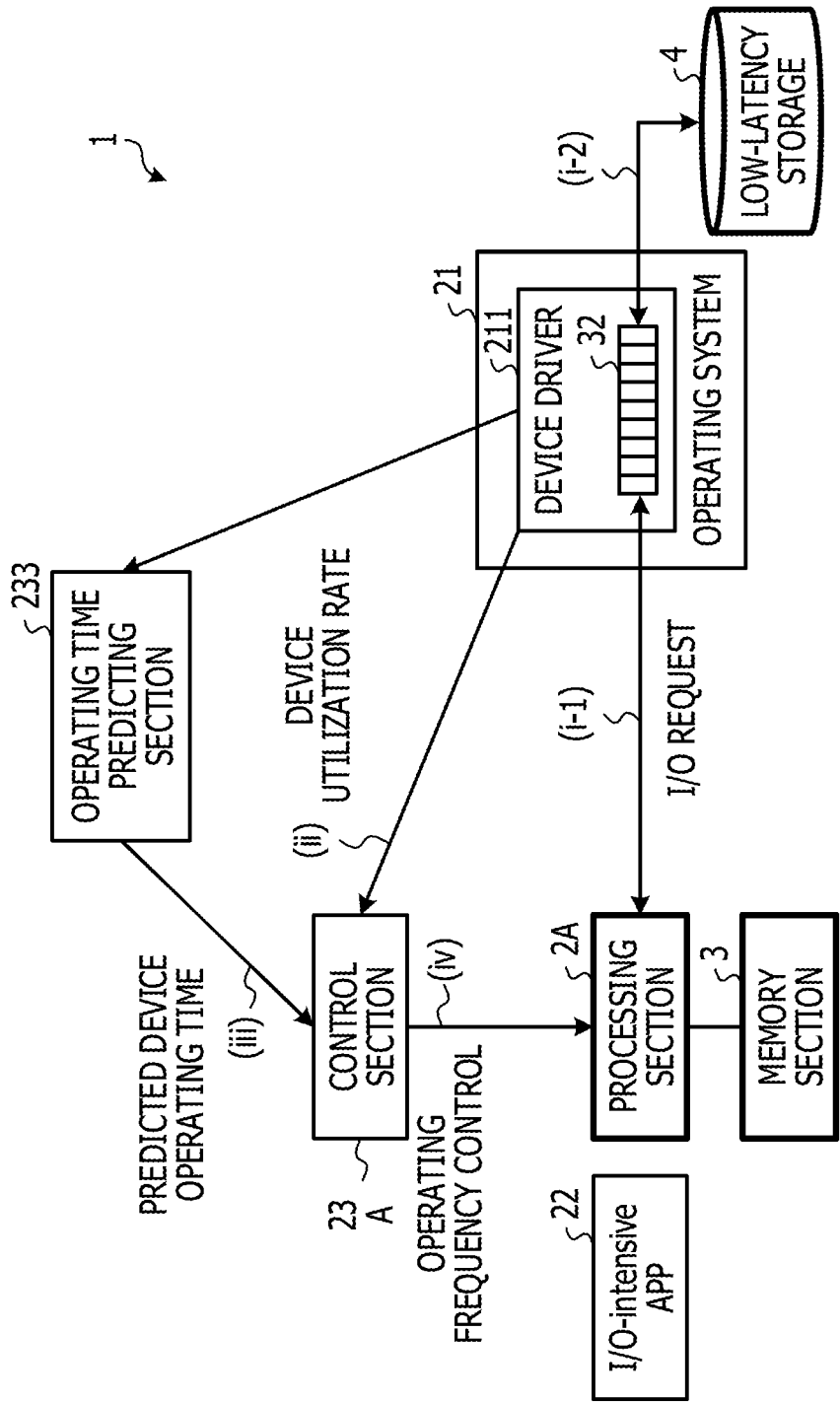
FIG. 19 is a block diagram illustrating an example of operation of a computer according to the second embodiment.

After the passage of "wait_time," the calculating section 231 of the control section 23A measures the device utilization rate as in the first embodiment (step S2; see (ii) in FIG. 19).

Next, the frequency control section 232A extracts "dec_thr" as a parameter defining the given threshold value from the control information 31 of the memory section 3, and determines whether or not the device utilization rate is less than the extracted "dec_thr" (step S3).

When it is determined that the device utilization rate is not less than "dec_thr" (is equal to or more than "dec_thr") (No in step S3), the operating time predicting section 233 predicts the device operating time T (step S12).

For example, the operating time predicting section 233 may obtain each of "N" and "request_size_i" based on parameters recorded by the OS 21 or the like, and predict the device operating time T using the prediction model illustrated in FIG. 17 and the foregoing Equation (1).

Then, the operating time predicting section 233 transmits (notifies) the predicted device operating time T to the frequency control section 232A (see (iii) in FIG. 19).

The frequency control section 232A compares the device operating time T received from the operating time predicting section 233 and "interval" with each other, and determines whether or not the device operating time T is more than "interval" (step S13).

When the frequency control section 232A determines that the device operating time T is more than "interval" (Yes in step S13), the frequency control section 232A decreases the operating frequency of the processor 1a to a given value, for example, sets the operating frequency of the processor 1a to a minimum value (step S14). The processing then proceeds to step S15.

When the frequency control section 232A determines that the device operating time T is equal to or less than "interval" (No in step S13), on the other hand, the frequency control section 232A performs control so as to decrease the operating frequency of the processor 1a by one step (step S4). The processing then proceeds to step S15.

In step S15, the frequency control section 232A sets the device operating time T to the waiting time "wait_time." One cycle of the operating frequency control is then ended.

When the frequency control section 232A determines that the device utilization rate is less than "dec_thr" in step S3 (Yes in step S3), on the other hand, the frequency control section 232A increases the operating frequency of the processor 1a, for example, sets the operating frequency of the processor 1a to a maximum value (step S5).

Then, the frequency control section 232A sets "interval" as the default value to the waiting time "wait_time" (step S16). One cycle of the operating frequency control is then ended.

Thus, the frequency control section 232A controls the operating frequency of the processor 1a in steps S4, S5, and S14 according to results of determination in steps S3 and S13 (see (iv) in FIG. 19).

Incidentally, after an end of step S15 or S16, the processing may proceed to step S11. In addition, in a case where the processor 1a is a multi-core processor, the processing illustrated in FIG. 18 may be performed for each core.

As described above, the second embodiment may produce effects similar to those of the first embodiment. In addition, the second embodiment may flexibly change control intervals of the control section 23A even when a tendency of access to the low-latency storage 4 varies due to the behavior of the I/O-intensive app 22 and the device operating time differs depending on timing.

3 Others

The technology according to the first embodiment and the second embodiment described above may be modified or changed and carried out as follows.

For example, in the control section 23 illustrated in FIG. 9, the functions of the calculating section 231 and the frequency control section 232 may be integrated in arbitrary combinations, or may each be divided. In addition, in the control section 23A illustrated in FIG. 16, the functions of the calculating section 231, the frequency control section 232A, and the operating time predicting section 233 may be integrated in arbitrary combinations, or may each be divided.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An apparatus for storage access management, the apparatus comprising:
    a memory;
    a processor; and
    a low latency solid state drive (SSD) configured to process an access from the processor at an access latency less than a time taken to change an operating frequency of the processor,
    the processor being coupled to the memory and the low latency SSD, the processor being configured to:
    execute an access processing that includes making access to the low latency SSD;
    execute a monitoring processing that includes obtaining a monitoring result by monitoring a state of usage of the low latency SSD in given timing; and
    execute a control processing that includes reducing, in response to the monitoring result indicating that the state of usage of the low latency SSD is less than a threshold, an operating frequency of the processor performing the access processing.

2. The apparatus according to claim 1,
    wherein the state of usage of the low latency storage is a utilization rate of the low latency storage, and
    the control processing is configured to perform control of decreasing the operating frequency of the processor when determining that the utilization rate of the low latency storage is equal to or higher than a given threshold value based on the monitoring result indicating the state of usage of the low latency storage.

3. The apparatus according to claim 2, wherein the control processing is configured to perform control of increasing the operating frequency of the processor when determining that the utilization rate of the low latency storage is lower than the given threshold value based on the monitoring result indicating the state of usage of the low latency storage.

4. The apparatus according to claim 1,
    wherein the access processing is configured to use a first queue, the first queue being a queue storing an access request directed to the low latency storage, and
    the monitoring the state of usage of the low latency storage is configured to monitor the access request stored in the first queue.

5. The apparatus according to claim 1, wherein the monitoring processing is configured to monitor the state of usage of the low latency storage based on a busy rate of the low latency storage.

6. The apparatus according to claim 1, wherein the monitoring processing is configured to monitor the state of usage of the low latency storage based on presence or absence of a busy response transmitted from the low latency storage.

7. The apparatus according to claim 1,
    wherein the given timing to be used in the monitoring processing includes timing obtained by adding a predetermined time to execution timing of control by the control processing, and
    the control processing is configured to change the predetermined time from a default value according to the monitoring result indicating the state of usage of the low latency storage.

8. The apparatus according to claim 7, wherein the processor is further configured to
    execute a predicting processing that includes predicting a processing time of the access by the low latency storage,
    the state of usage of the low latency storage is a utilization rate of the low latency storage, and
    the control processing is configured to set the processing time as the given time when determining that the utilization rate of the low latency storage is equal to or higher than a given threshold value based on the monitoring result.

9. The apparatus according to claim 8, wherein the control processing is configured to perform control of decreasing the operating frequency of the processor to a given value when determining that the utilization rate of the low latency storage is equal to or higher than the given threshold value based on the monitoring result and when determining that the processing time is more than the default value.

10. A non-transitory computer-readable storage medium for storing a program which causes a processor to perform processing for storage access management, the processing comprising:
   executing an access processing that includes making access to a low latency solid state drive (SSD), the low latency SSD being a storage configured to process an access from the processor at an access latency less than a time taken to change an operating frequency of the processor;
   executing a monitoring processing that includes obtaining a monitoring result by monitoring a state of usage of the low latency SSD in given timing; and
   executing a control processing that includes changing reducing, in response to the monitoring result indicating that the state of usage of the low latency SSD is less than a threshold, an operating frequency of the processor performing the access processing.

11. The non-transitory computer-readable storage medium according to claim 10,
   wherein the state of usage of the low latency storage is a utilization rate of the low latency storage, and
   the control processing is configured to perform control of decreasing the operating frequency of the processor when determining that the utilization rate of the low latency storage is equal to or higher than a given threshold value based on the monitoring result indicating the state of usage of the low latency storage.

12. The non-transitory computer-readable storage medium according to claim 11, wherein the control processing is configured to perform control of increasing the operating frequency of the processor when determining that the utilization rate of the low latency storage is lower than the given threshold value based on the monitoring result indicating the state of usage of the low latency storage.

13. The non-transitory computer-readable storage medium according to claim 10,
   wherein the access processing is configured to use a first queue, the first queue being a queue storing an access request directed to the low latency storage, and
   the monitoring the state of usage of the low latency storage is configured to monitor the access request stored in the first queue.

14. The non-transitory computer-readable storage medium according to claim 10, wherein the monitoring processing is configured to monitor the state of usage of the low latency storage based on a busy rate of the low latency storage.

15. The non-transitory computer-readable storage medium according to claim 10, wherein the monitoring processing is configured to monitor the state of usage of the low latency storage based on presence or absence of a busy response transmitted from the low latency storage.

16. The non-transitory computer-readable storage medium according to claim 10,
   wherein the given timing to be used in the monitoring processing includes timing obtained by adding a predetermined time to execution timing of control by the control processing, and
   the control processing is configured to change the predetermined time from a default value according to the monitoring result indicating the state of usage of the low latency storage.

17. The non-transitory computer-readable storage medium according to claim 16, wherein the processor is further configured to
   execute a predicting processing that includes predicting a processing time of the access by the low latency storage,
   the state of usage of the low latency storage is a utilization rate of the low latency storage, and
   the control processing is configured to set the processing time as the given time when determining that the utilization rate of the low latency storage is equal to or higher than a given threshold value based on the monitoring result.

18. The non-transitory computer-readable storage medium according to claim 17, wherein the control processing is configured to perform control of decreasing the operating frequency of the processor to a given value when determining that the utilization rate of the low latency storage is equal to or higher than the given threshold value based on the monitoring result and when determining that the processing time is more than the default value.

19. A method of storage access management performed by a computer, the method comprising:
   executing an access processing that includes making access to a low latency solid state drive (SSD), the low latency SSD being a storage configured to process an access from the processor at an access latency less than a time taken to change an operating frequency of the processor;
   executing a monitoring processing that includes obtaining a monitoring result by monitoring a state of usage of the low latency SSD in given timing; and
   executing a control processing that includes reducing, in response to the monitoring result indicating that the state of usage of the low latency SSD is less than a threshold, an operating frequency of the processor performing the access processing.

20. The method according to claim 19,
   wherein the state of usage of the low latency storage is a utilization rate of the low latency storage, and
   the control processing is configured to perform control of decreasing the operating frequency of the processor when determining that the utilization rate of the low latency storage is equal to or higher than a given threshold value based on the monitoring result indicating the state of usage of the low latency storage.

* * * * *